United States Patent
Kanematsu et al.

(10) Patent No.: US 7,576,742 B2
(45) Date of Patent: Aug. 18, 2009

(54) PICTURE DISPLAY CONTROLLER, MOVING-PICTURE INFORMATION TRANSMISSION/RECEPTION SYSTEM, PICTURE DISPLAY CONTROLLING METHOD, MOVING-PICTURE INFORMATION TRANSMITTING/RECEIVING METHOD, AND COMPUTER PROGRAM

(75) Inventors: Koichi Kanematsu, Tokyo (JP); Tetsu Natsume, Chiba (JP); Tsukasa Yoshimura, Tokyo (JP)

(73) Assignees: Sony Corporation, Tokyo (JP); Sony Music Entertainment (Japan) Inc., Tokyo (JP)

( * ) Notice: Subject to any disclaimer, the term of this patent is extended or adjusted under 35 U.S.C. 154(b) by 1224 days.

(21) Appl. No.: 10/287,149

(22) Filed: Nov. 4, 2002

(65) Prior Publication Data

US 2003/0122949 A1    Jul. 3, 2003

(30) Foreign Application Priority Data

Nov. 6, 2001    (JP)  .............................. 2001-340429

(51) Int. Cl.
    *G06T 15/20*    (2006.01)
(52) U.S. Cl. ....................................... 345/427; 715/719
(58) Field of Classification Search ................. 345/427, 345/420; 715/718, 719, 720, 721, 722, 723, 715/725
See application file for complete search history.

(56) References Cited

U.S. PATENT DOCUMENTS

| | | | | |
|---|---|---|---|---|
| 5,146,557 A | * | 9/1992 | Yamrom et al. ............. | 715/723 |
| 5,642,185 A | * | 6/1997 | Altrieth et al. ............... | 399/81 |
| 5,675,364 A | * | 10/1997 | Stedman et al. ............. | 345/211 |
| 5,729,471 A | * | 3/1998 | Jain et al. .................... | 725/131 |
| 5,801,760 A | * | 9/1998 | Uomori ........................ | 348/47 |
| 5,838,906 A | * | 11/1998 | Doyle et al. ............. | 715/501.1 |
| 5,841,409 A | * | 11/1998 | Ishibashi et al. ............... | 345/8 |
| 5,850,352 A | * | 12/1998 | Moezzi et al. .............. | 345/419 |
| 5,896,290 A | * | 4/1999 | Katsuta et al. ................ | 700/83 |

(Continued)

FOREIGN PATENT DOCUMENTS

JP      2001325612 A   *   11/2001

OTHER PUBLICATIONS

Image and Vision Computing vol. 12, Issue 10, Dec. 1994, pp. 639-647 "Determining the gaze of faces in images" Andrew Gee and Roberto Cipolla.*

*Primary Examiner*—Xiao M Wu
*Assistant Examiner*—Daniel F Hajnik
(74) *Attorney, Agent, or Firm*—Finnegan, Henderson, Farabow, Garrett & Dunner, L.L.P.

(57) ABSTRACT

A picture display controller can display picture data taken from a plurality of viewpoints in a flexible manner. For displaying moving-picture data taken from the plurality of viewpoints, read from a storage medium or received from a server, switching can be made at any time between a manual mode in which a picture is selected or synthesized based on designated information such as viewpoint position included in a viewpoint setting command from the controller operated by the user or from the sensor such as head tracker and displayed and a preset mode in which moving-picture data taken from different viewpoints are selected one after another according to a picture display program preset for a moving picture and displayed. With this system design, a user's setting can be made effective only for a picture portion in which he is interested.

22 Claims, 16 Drawing Sheets

CAMERA SITES-PLAN A

| PICTURE FROM CAMERA A1 | PICTURE FROM CAMERA A2 | PICTURE FROM CAMERA A3 |
|---|---|---|
| PICTURE FROM CAMERA A4 | PICTURE FROM CAMERA A5 | OTHER PICTURE (e.g., CG) |

DATA STRUCTURE (FRAME AT TIME t1)

U.S. PATENT DOCUMENTS

| | | | |
|---|---|---|---|
| 6,028,584 A * | 2/2000 | Chiang et al. | 345/628 |
| 6,111,582 A * | 8/2000 | Jenkins | 345/421 |
| 6,124,843 A * | 9/2000 | Kodama | 715/856 |
| 6,139,434 A * | 10/2000 | Miyamoto et al. | 463/32 |
| 6,144,375 A * | 11/2000 | Jain et al. | 715/500.1 |
| 6,191,808 B1 * | 2/2001 | Katayama et al. | 348/39 |
| 6,191,819 B1 * | 2/2001 | Nakano | 348/333.03 |
| 6,195,102 B1 * | 2/2001 | McNeil et al. | 345/427 |
| 6,208,379 B1 * | 3/2001 | Oya et al. | 348/211.11 |
| 6,215,505 B1 * | 4/2001 | Minami et al. | 345/473 |
| 6,246,801 B1 * | 6/2001 | Boyce et al. | 382/248 |
| 6,256,037 B1 * | 7/2001 | Callahan | 345/419 |
| 6,263,100 B1 * | 7/2001 | Oshino et al. | 382/154 |
| 6,268,873 B1 * | 7/2001 | Ouchi | 345/473 |
| 6,283,857 B1 * | 9/2001 | Miyamoto et al. | 463/31 |
| 6,285,394 B1 * | 9/2001 | Huang | 348/143 |
| 6,295,064 B1 * | 9/2001 | Yamaguchi | 345/419 |
| 6,466,207 B1 * | 10/2002 | Gortler et al. | 345/427 |
| 6,636,234 B2 * | 10/2003 | Endo et al. | 345/646 |
| 2001/0003449 A1 * | 6/2001 | Kimura | 345/157 |
| 2001/0037509 A1 * | 11/2001 | Kligman | 725/105 |
| 2002/0010655 A1 * | 1/2002 | Kjallstrom | 705/27 |
| 2002/0015040 A1 * | 2/2002 | Takatsuka et al. | 345/427 |
| 2002/0063714 A1 * | 5/2002 | Haas et al. | 345/473 |
| 2002/0090143 A1 * | 7/2002 | Endo et al. | 382/282 |
| 2002/0171666 A1 * | 11/2002 | Endo et al. | 345/619 |
| 2002/0180697 A1 * | 12/2002 | Freiberger et al. | 345/156 |

* cited by examiner

CAMERA SITES-PLAN B (a)

| TIME | VIEWPOINT | SIGHT LINE DIRECTION | VIEW ANGLE | etc. |
|------|-----------|----------------------|------------|------|
| T1   | A1        | B1                   | C1         | D1   |
| T2   | A1        | B1                   | C2         | D2   |
| T3   | A1        | B2                   | C3         | D3   |
| ...  | ...       | ...                  | ...        | ...  |

(b)

PICTURE DISPLAY CONTROLLER, MOVING-PICTURE INFORMATION TRANSMISSION/RECEPTION SYSTEM, PICTURE DISPLAY CONTROLLING METHOD, MOVING-PICTURE INFORMATION TRANSMITTING/RECEIVING METHOD, AND COMPUTER PROGRAM

BACKGROUND OF THE INVENTION

1. Field of the Invention

The present invention relates to a picture display controller, moving-picture information transmission/reception system, picture display controlling method, moving-picture information transmitting/receiving method, and a computer program. More particularly, the present invention relates to a picture display controller, moving-picture information transmission/reception system, picture display controlling method, moving-picture information transmitting/receiving method, and a computer program, capable of free switching between a display mode in which a plurality of pictures having been taken from different viewpoints or in different sight line directions are displayed in a predetermined order of data output and a display mode in which pictures are selected for display at the user's own will.

2. Description of the Related Art

Recently, picture data viewable from different viewpoints, such as a panoramic picture, full-celestial picture, etc. have been utilized more and more. For example, there has been proposed a system in which pictures of an object, having been taken from a plurality of viewpoints or sight line directions, can be stored in a storage medium such as DVD, CD, etc. and the stored pictures displayed on a display such as a CRT (cathode ray tube), liquid crystal display (LCD) device or the like can be viewed from the viewpoint moved to a freely selected position by the user operating a controller when displaying. Also, there has been proposed a system in which pictures of an object, having been taken from a plurality of viewpoints or sight line directions, can be distributed via a communications system such as Internet to the users and each user can selectively display the pictures, having been taken from his preferred viewpoint or sight line direction, on a display of a personal computer (PC) or the like by operating a mouse of the PC.

Picture data viewable from different viewpoints are produced by splicing a plurality of pictures having been taken by cameras positioned at a corresponding plurality of viewpoints, for example, to one another. An inter-camera picture can be produced from pictures having been taken by neighboring cameras by correcting picture data, for example, by means of the view interpolation or the like. A moving picture can be produced by temporally synchronizing moving-picture data having been taken by a plurality of cameras and then making the similar processing of the synchronized data. The method of producing such an all-directional picture is known from the disclosure in the publication "ck time VR-An Image-Based Approach to Virtual Environment Navigation", S. E. Chen, Computer Graphics SIGGRAPH, pp. 29-38, 1995.

To reproduce, for display, a picture viewable from freely selected viewpoints by reading it from a storage medium such as DVD or the like, a viewpoint from which picture data to be displayed has been taken will be selected by the user himself or according to a program preset for the picture data. In a data distribution system by broadcasting, via Internet or satellite communications network, a user-selected one of pictures having been taken from a plurality of viewpoints and having been distributed from a data provider, or only a representative picture having been predetermined at the data provider, will be displayed on a display.

In case a picture to be displayed is a still picture, the user can read still pictures viewable from preferred viewpoints one after another from a storage medium such as DVD or the like at any time for display. In case the pictures are moving pictures, however, the user will use an input device such as a mouse or a predetermined controller to select viewpoints from which he wants to view the pictures while viewing them.

On the other hand, there has also been proposed a method of selecting, for display, moving pictures, having been taken from different viewpoints, according to a program having been preset for the pictures.

In displaying moving pictures viewable from different viewpoints, such as a panoramic picture, fall-celestial moving picture, etc., selection of a viewpoint, made while the user is viewing the pictures, is effective when the user's positive will to select the viewpoints lasts. However, when the will becomes weak, the selection will bother the user. Unless a command for shifting the viewpoint from one to another is entered by the user operating the controller, a moving picture to be viewed from the last entered viewpoint will continuously be displayed, resulting in a monotonous display of the moving picture. On the other hand, the selection of a picture according to the program having been preset for the moving-picture data will lead to display of a picture to be viewed from a viewpoint independent of the user's will.

As above, when displaying moving pictures viewable from different viewpoints, the selection of viewpoints will bother the user, while selection and display of moving pictures according to a preset program will not reflect any user's will.

SUMMARY OF THE INVENTION

It is therefore an object of the present invention to overcome the above-mentioned drawbacks of the related art by providing a picture display controller, moving-picture information transmission/reception system, picture display controlling method, moving-picture information transmitting/receiving method, and a computer program, capable of free switching between a display mode in which a plurality of pictures having been taken from different viewpoints or in different sight line directions are displayed in a predetermined order of data output and a display mode in which the pictures are selected for display at the user's own will.

According to the first aspect of the present invention, there is provided a picture display controller for outputting, to a display means, a picture having been taken from a specific point of view, selected or synthesized from moving-picture data including pictures having been taken from a plurality of viewpoints, the apparatus including a control means for selecting a picture to be displayed on the display means;

the control means being designed to select and execute either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from a user's input means or a sensor, make a shift from the preset mode in progress to the manual mode when the viewpoint setting command is entered, and select a picture having been taken from a viewpoint conforming to the entered viewpoint setting command for display on the display means.

In the above picture display controller, the control means shifts to the preset mode when any new viewpoint setting command is not entered within a predetermined threshold time Ta in the course of the manual mode.

Also in the above picture display controller, the input means is designed operable by the user to output at least any one of a viewpoint position, sight line direction and angle of a picture as a viewpoint setting command, and the control means is designed to select a picture whose viewpoint corresponds to at least any one of the viewpoint position, sight line direction and view angle of the picture, designated as a viewpoint setting command.

Also in the above picture display controller, the sensor is designed to output at leans any one of the viewpoint position, sight line direction and view angle of the picture designed as a viewpoint setting command based on detection information from the sensor, and the control means is designed to select a picture having been taken from a viewpoint corresponding to the viewpoint setting command as which at least any one of the viewpoint position, sight line direction and view angle of the picture is designated.

Also in the above picture display controller, the sensor includes a gyro functioning to detect a direction and is designed to output, as the viewpoint setting command, data which is based on direction information acquired by the gyro, and the control means is designed to select a picture having been taken from a viewpoint conforming to a viewpoint setting command including data which is based on the direction information acquired by the gyro.

Also in the picture display controller, the sensor includes a sight line direction detecting means for making a picture analysis based on a picture of the user's face and is designed to output, as the viewpoint setting command, data which is based on the direction information acquired through the picture analysis, and the control means is designed to select a picture having been taken from a viewpoint conforming to a viewpoint setting command including data which is based on the direction information acquired through the picture analysis.

Also in the above picture display controller, the control means is designed to synthesize a picture having been taken from a viewpoint, not included in the moving-picture data, based on the moving-picture data including pictures having been taken from the plurality of viewpoints, and output the synthetic picture to the display means.

Also in the picture display controller, the control means is designed to display, on the display means, displayable viewpoint position data corresponding to moving-picture data including pictures having been taken from a plurality of viewpoints and data for identification of the viewpoint position of a picture being displayed on the display means.

Also in the picture display controller, the moving-picture information including pictures having been taken from a plurality of viewpoints includes pictures having been taken from a plurality of viewpoints set correspondingly to a plurality of object positions spaced from each other, and the control means is designed to select a picture to be displayed based on the moving-picture information including the pictures having been taken from the plurality of viewpoints set correspondingly to the plurality of object positions spaced from each other.

According to the second aspect of the present invention, there is provided a moving-picture transmission/reception system including a server holding moving-picture data including pictures having been taken from a plurality of viewpoints and distributing the moving-picture data, and a user system to display a picture based on the moving-picture data received from the server, the user system including a control means for selecting a picture to be displayed on the display means;

the control means being designed to select and execute either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from a user's input means or a sensor, make a shift from the preset mode in progress to the manual mode when the viewpoint setting command is entered, and select a picture having been taken from a viewpoint conforming to the entered viewpoint setting command for display on the display means.

Also in the above moving-picture information transmission/reception system, the server distributes picture data having been taken from all viewpoints and included in the moving-picture data, the user system includes a storage means for storing the picture data having been taken from all viewpoints and included in the moving picture data and the preset picture display program, and the control means is designed to output, when in the preset mode, picture data having been taken from a specific viewpoint conforming to the preset picture display program while outputting, when in the manual mode, picture data having been taken from a specific viewpoint conforming to the viewpoint setting command.

Also in the moving-picture information transmission/reception system, the server distributes picture data having been taken from all viewpoints and included in the moving-picture data, and the user system is designed to receive, when in the preset mode, the picture data having been taken from the specific viewpoint conforming to the preset picture display program set at the server and output the received data to the display means, while transmitting, when in the manual mode, picture designation information corresponding to the viewpoint setting command to the server while receiving picture data sent from the server according to the picture designation information, and output the picture data having been taken from the specific viewpoint conforming to the viewpoint setting command.

According to the third aspect of the present invention, there is provided a picture display controlling method of outputting, to a display means, a picture having been taken from a specific point of view, selected or synthesized from moving-picture data including pictures having been taken from a plurality of viewpoints, the method including steps of:

setting either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from a user's input means or a sensor;

selecting a picture to be displayed on the display means according to a mode set in the mode setting step; and making a shift from the preset mode in progress to the manual mode when the viewpoint setting command is entered, and selecting a picture having been taken from a viewpoint conforming to the entered viewpoint setting command for display on the display means.

In the above picture display controlling method, there is further provided a step for shifting to the preset mode when any new viewpoint setting command is not entered within a predetermined threshold time Ta in the course of the manual mode.

Also in the above picture display controlling method, the step of selecting a picture in the manual mode is to select a picture whose viewpoint corresponds to at least any one of the viewpoint position, sight line direction and view angle of the picture, designated as a viewpoint setting command.

Also in the above picture display controlling method, the sensor includes a gyro functioning to detect a direction and output, as the viewpoint setting command, data which is based on direction information acquired by the gyro, and the step of selecting a picture in the manual mode is to select a picture having been taken from a viewpoint conforming to a viewpoint setting command including data which is based on the direction information acquired by the gyro.

Also in the picture display controlling method, the sensor includes a sight line direction detecting means for making a picture analysis based on a picture of the user's face to output, as the viewpoint setting command, data which is based on the direction information acquired through the picture analysis, and the step of selecting a picture in the manual mode is to select a picture having been taken from a viewpoint conforming to a viewpoint setting command including data which is based on the direction information acquired through the picture analysis.

Also in the above picture display controlling method, there is further provided a step of synthesizing a picture having been taken from a viewpoint, not included in the moving-picture data, based on the moving-picture data including pictures having been taken from the plurality of viewpoints, and outputting the synthetic picture to the display means.

Also in the picture display controlling method, there is further provided a step of displaying, on the display means, displayable viewpoint position data corresponding to moving-picture data including pictures having been taken from a plurality of viewpoints and data for identification of the viewpoint position of a picture being displayed on the display means.

Also in the picture display controlling method, the moving-picture data including pictures having been taken from a plurality of viewpoints includes pictures having been taken from a plurality of viewpoints set correspondingly to a plurality of object positions spaced from each other, and there is further provided a step of selecting a picture to be displayed based on the moving-picture information including the pictures having been taken from the plurality of viewpoints set correspondingly to the plurality of object positions spaced from each other.

According to the fourth aspect of the present invention, there is provided a moving-picture transmitting/receiving method for use in a moving-picture information transmission/reception system including a server holding moving-picture data including pictures having been taken from a plurality of viewpoints and distributing the moving-picture data, and a user system to display a picture based on the moving-picture data received from the server, the user system working to:

select and execute either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from a user's input means or a sensor;

make a shift from the preset mode in progress to the manual mode when the viewpoint setting command is entered; and select a picture having been taken from a viewpoint conforming to the entered viewpoint setting command for display on the display means.

Also in the above moving-picture information transmitting/receiving method, the server distributes picture data having been taken from all viewpoints and included in the moving-picture data, and the user system stores, into a storage means, the picture data having been taken from all viewpoints and included in the moving-picture data and the preset picture display program, outputs, when in the preset mode, picture data having been taken from a specific viewpoint conforming to the preset picture display program while outputting, when in the manual mode, picture data having been taken from a specific viewpoint conforming to the viewpoint setting command.

Also in the moving-picture information transmitting/receiving method, the server distributes picture data having been taken from all viewpoints and included in the moving picture data, and the user system receives, when in the preset mode, the picture data having been taken from the specific viewpoint conforming to the preset picture display program set at the server while outputting the received data to the display means and transmits, when in the manual mode, picture designation information corresponding to the viewpoint selling command to the server while receiving picture data sent from the server according to the picture designation information, and output the picture data having been taken from the specific viewpoint conforming to the viewpoint setting command.

According to the fifth aspect of the present invention, there is provided a computer program to provide a picture display control/processing for outputting, to a display means, a picture having been taken from a specific point of view, selected or synthesized from moving-picture data including pictures having been taken from a plurality of viewpoints, the program including steps of:

setting either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from a user's input means or a sensor;

selecting a picture to be displayed on the display means according to a mode set in the mode setting step; and making a shift from the preset mode in progress to the manual mode when the viewpoint setting command is entered, and selecting a picture having been taken from a viewpoint conforming to the entered viewpoint setting command for display on the display means.

Note that the computer program according to the present invention can be provided to a general-purpose computer system by a computer-readable recoding medium such as CD, FD or MO in which it is recorded or by distribution via a communication medium such as a network. The computer program can thus be executed in the computer system which can read it.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The picture display controller, moving-picture information transmission/reception system, picture display controlling method and moving-picture information transmitting/receiving method, according to the present invention, will be described herebelow with reference to the accompanying drawings.

Moving-picture data including views of an object from multiple points is stored in a storage medium such as DVD, CD or the like, displayed on a display means such as CRT, LCD or the like. Otherwise, such data is distributed to the user via the Internet or any other data distribution network, wireless or wired, and displayed on a display screen of a user's terminal.

Figure 1:
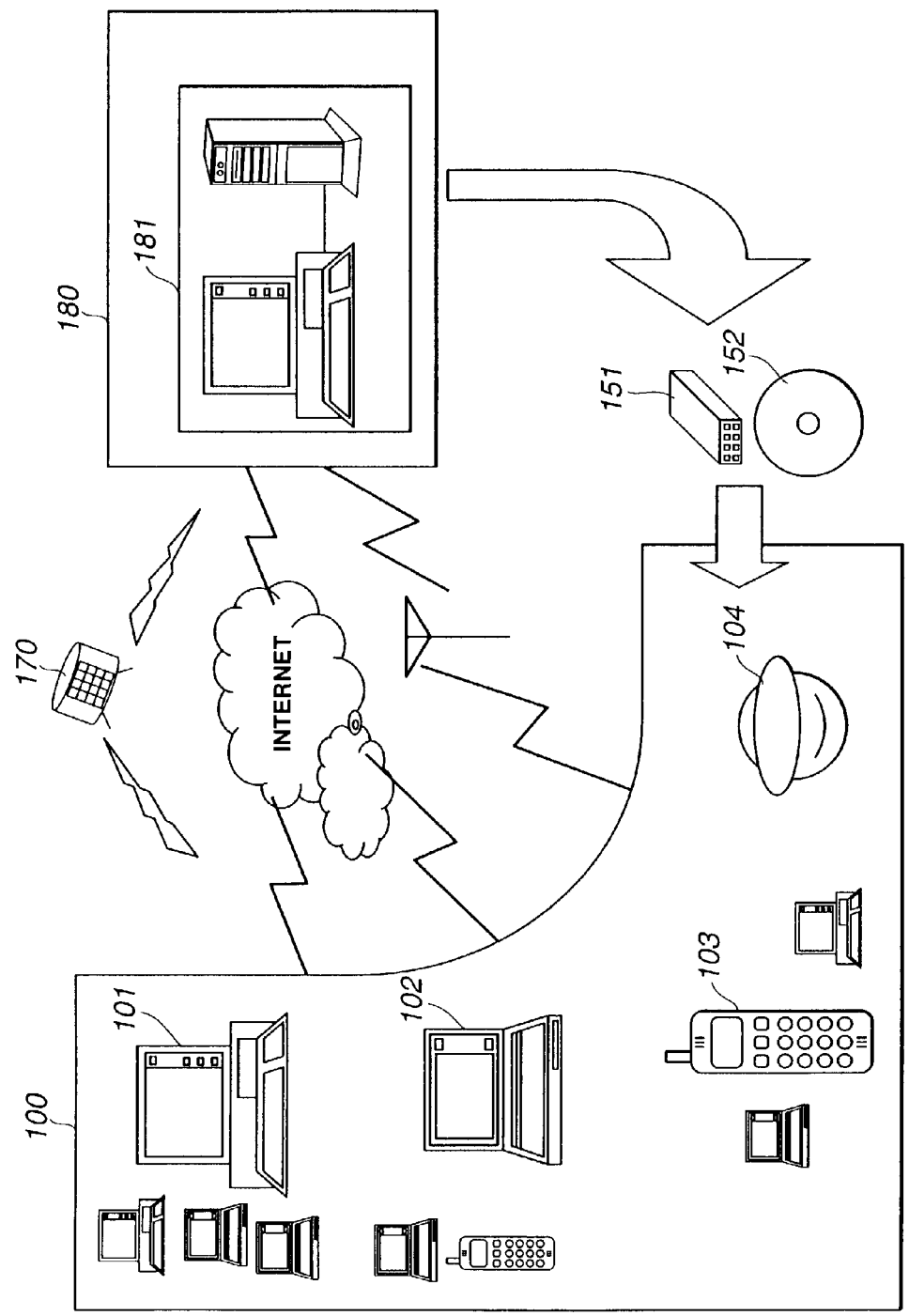
FIG. 1 explains an example system in which the picture display controller according to the present invention is applied.

FIG. 1 is a sketch showing the concept of the moving-picture content utilization in the system according to the present invention. Moving-picture content is provided to a user site 100 through distribution thereof from a server 181 at a content provider site 180 via a satellite, Internet or a data communication network 170, wireless or wired, or as stored in a removable memory 151 having storage elements such as flash memory or a storage medium 152 such as DVD, CD or the like.

At the user site 100, there is used a desk-top PC (personal computer) 101 or notebook-sized PC 102, provided with a monitor display, portable telephone terminal 103, head-mountable display 104 or the like to reproduce the moving-picture content received via the network or stored in the storage medium. The above players at the user site 100 are presented as typical ones, and the user may further use a TV set, game machine or the like to reproduce the received data. Also, the content provider site 180 may include a service provider to distribute data via the Internet, broadcasting station, etc.

The present invention deals with a moving picture including picture data having been taken from multiple points of view. The moving picture including views of an object from different points is produced based on picture data from cameras which take pictures from multiple different viewpoints. It should be noted that the "pictures having been taken from multiple different viewpoints" referred to herein include pictures having been taken by cameras located at different sites as well as those having been taken from different shooting directions and at different angles of view. That is, the "picture data from multiple viewpoints" are defined herein as pictures having been taken by the cameras located in different positions spatially separated from each other, each of pictures forming together a picture having been taken about one spatial point, namely, pictures having been taken at an angle of 360 degrees, pictures having been taken from the same point in different directions, and individual pictures having been taken at different angles of view.

As will be discussed below, the system according to the present invention is also designed so that the user can designate, as pictures from different viewpoints, inter-camera pictures produced based on pictures having been taken by a plurality of cameras which take different pictures with different positions, directions or angles of view being set, produce a panoramic picture, 360-degree picture, all-directional picture, full-celestial picture and the line based on the pictures having been taken by the plurality of cameras, for example, and select and display a picture having been having been taken from a desired viewpoint. The production of picture data from pictures having been taken from a plurality of viewpoints is known from the disclosure in the publication "ck time VR-An Image-Based Approach to Virtual Environment Navigation", S. E. Chen, Computer Graphics SIG-GRAPH, pp. 29-38, 1995 and others.

Figure 2:
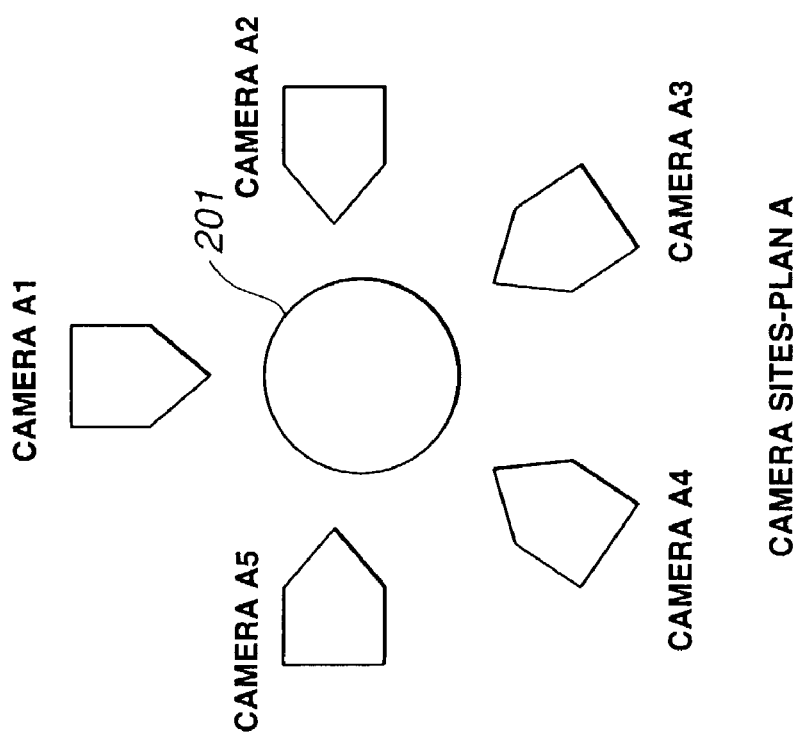
FIG. 2 explains an example of picture data acquisition from multiple viewpoints and an example of data structure.

The above will be described below with reference to FIG. 2 showing an example picture data structure including pictures different in viewpoints from each other. FIG. 2 also shows an example plan A of camera sites. In the example plan A, five cameras A1 to A5 located nearly regularly around an object 201 to take pictures of the object 201. The multiple moving-picture data having been taken by the five cameras A1 to A5 are taken as synchronous data and stored in a storage medium or distributed via a network. For example, frame data having been taken at a time t1, of the moving-picture data having been taken by the cameras A1 to A5 located as shown in FIG. 2, are stored in a storage medium or distributed as data structured as also shown in FIG. 2. According to a viewpoint designated by the user or a preset viewpoint, one is selected from the plurality of moving-picture data having been taken by the five cameras A1 to A5, and displayed on a user's display unit.

Figure 3:
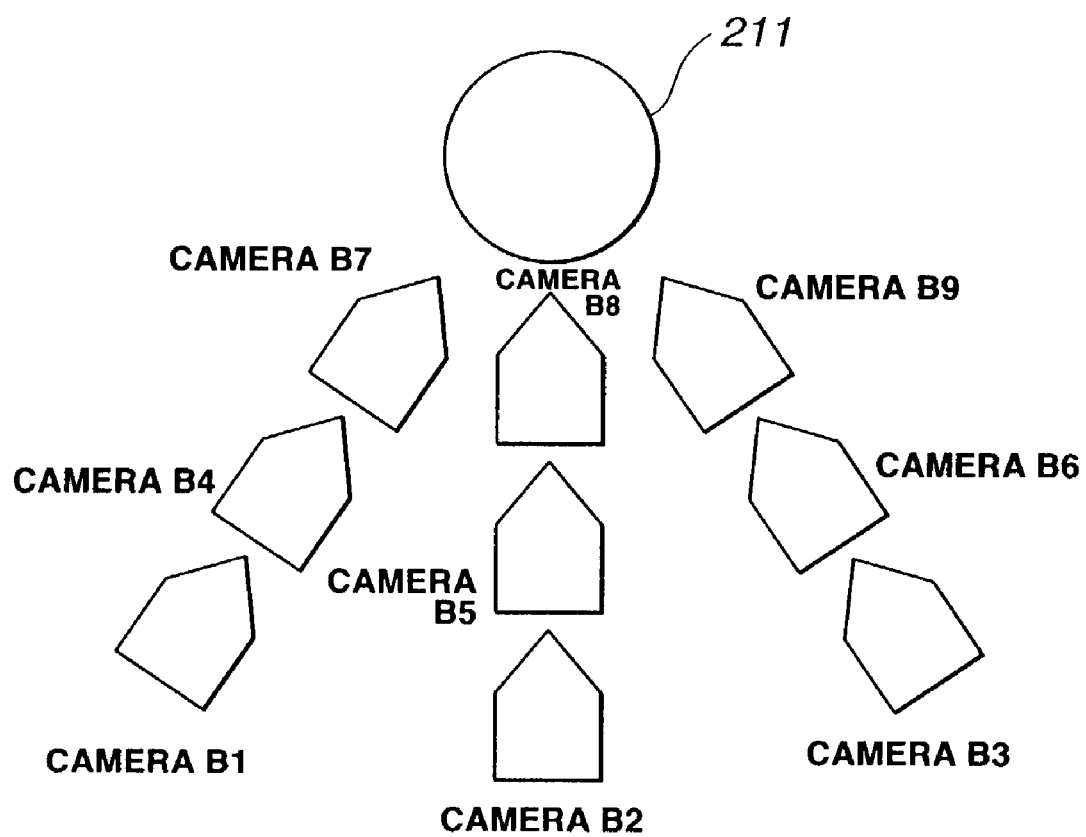
FIG. 3 explains other examples of picture data acquisition from multiple viewpoints.

FIG. 3 also shows an example plan B of camera sites. In this plan, nine cameras B1 to B9 are located in three different lines, front, right oblique and left oblique, toward an object 211 and at three different distances, near, middle and far, from the object 211. In this example, nine moving-picture data are taken as synchronous data and stored into a storage medium or distributed via a data communication network, as in the example shown in FIG. 2.

Figure 4:
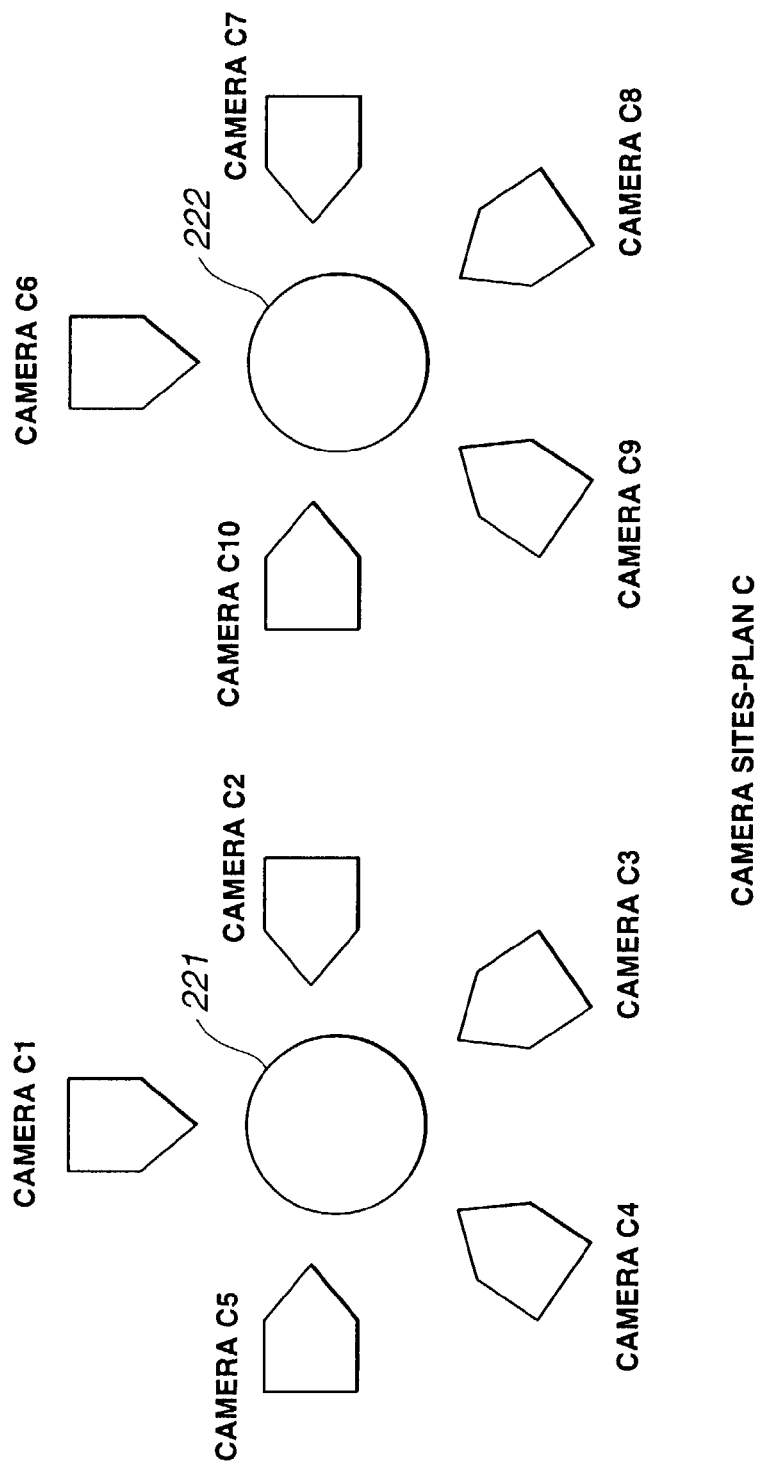
FIG. 4 explains still other examples of picture data acquisition from multiple viewpoints.

FIG. 4 also shows an example plan C of camera sites. In the plan C, five cameras C1 to C5 are located at nearly equal intervals around an object 221, while in the plan D, cameras C6 to C10 are also located nearly regularly around an object 222. It should be noted that in this case, the objects 221 and 222 may be specific different objects or persons. Also, the objects 221 and 222 may be a right-side and left-side areas, respectively, of a soccer field, for example. In this example, ten moving-picture data are taken as synchronous data and stored in a storage medium or distributed via a data communication network, as in the example shown in FIG. 2.

Figure 5:
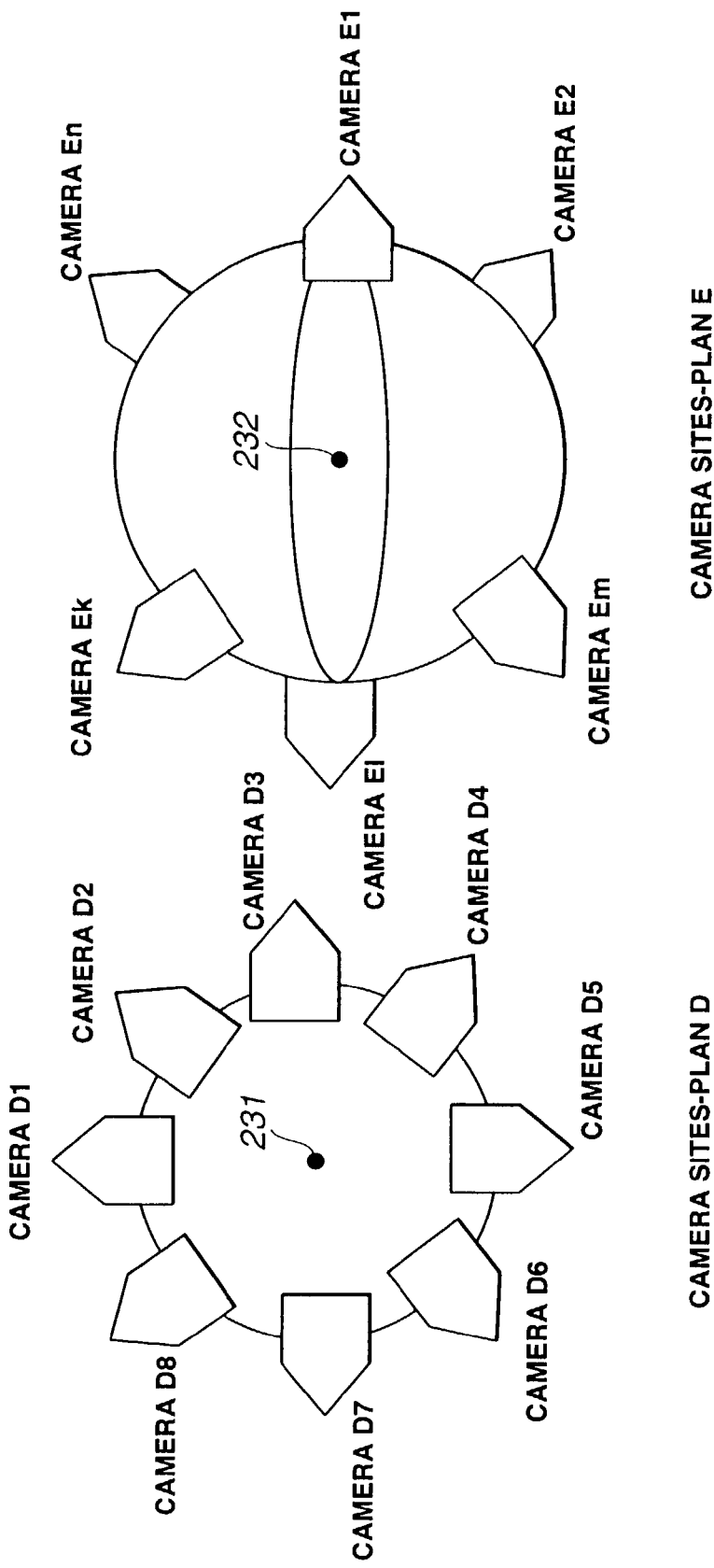
FIG. 5 explains yet other examples of picture data acquisition from multiple viewpoints.

FIG. 5 also shows example plans D and E of camera sites. In the example D, cameras D1 to D8 are located around a center point 231 in a 360-degree plane including the center point 231 to take 360-degree plane pictures of the surrounding of the point 231, while in the example E, cameras El to En are located around a center 232 of a spherical object in full-celestial direction about the center 232 to take full-celestial pictures. In these examples, moving-picture data from the cameras are taken as synchronous data and stored into a storage medium or distributed via a data communication network, as in the case shown in FIG. 2.

Note that the cameras may be located in any various manners other than in FIGS. 2 to 5. For example, the location of the cameras in the 360-degree plane (in the plan D) or the full-celestial-directional location of the cameras (in the plan E) may be set in different positions as in FIG. 4 to take pictures in the 360-degree plane (as in the plan D) or in the full-celestial direction (E) from the different positions.

Note that the plurality of pictures having been taken by the cameras are taken as individual ones from the cameras and stored in a storage medium or distributed via a data communication network, and a selected one of them is displayed on a user's display. It should be noted that inter-camera picture data can be produced using the image synthesis technique such as view interpolation or the like, a panoramic picture, 360-degree image, all-directional picture, full-celestial-directional picture and the like be produced from the inter-camera picture in advance, and a picture from a desired viewpoint be selected by the user from the pictures thus produced for display on his display. That is, the user can also designate, as pictures from different viewpoints, the inter-camera picture produced based on the pictures acquired using the plurality of cameras located with the different positions, directions or angles of view being set as in FIGS. 2 to 5. For example, it is possible to produce a panoramic picture, 360-degree image, all-directional picture, full-celestial-directional picture and the like in advance based on pictures having been taken by the plurality of cameras, select and display a picture thus produced and having been taken from a desired viewpoint.

The moving-picture data including data having been taken from the different viewpoints are read from a storage medium or selected from distributed data for display on a user's display in any of the following two manners. One of the manners is a manual mode in which a designated picture is selected or synthesized based on a user-defined viewpoint for display. The other manner is a preset mode in which moving-picture data having been taken from different viewpoints are selected and displayed one after another according to a display program preset for a moving picture.

Figure 6:
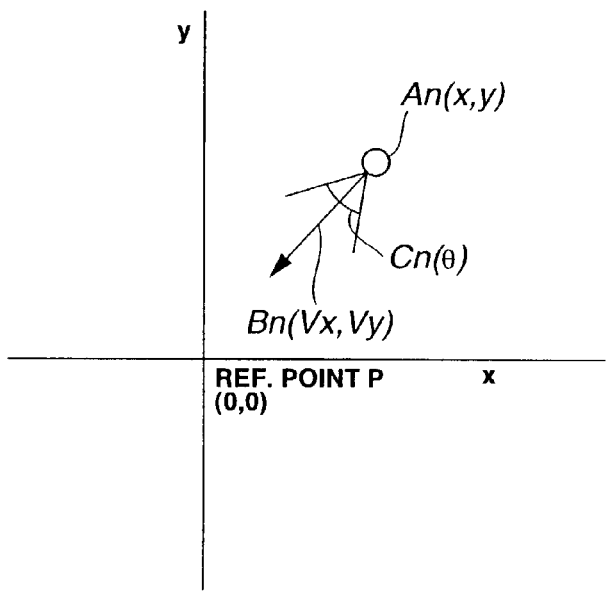
FIG. 6 explains a parameter configuration corresponding to pictures to be processed in the picture display controller according to the present invention.

An example preset display picture program under which a moving-picture display sequence is set will be described with reference to FIG. 6. As shown in FIG. 6(a), the program includes parameters such as viewpoint position data (A), sight line direction data (B), angle of view (C1) and other data (D) corresponding to a time (T). The preset display picture program is configured as time-series data to identify a picture for display. The above preset mode is the mode in which a picture is displayed according to the preset display picture program.

In FIG. 6(a), times T1, T2, ... indicate elapsed times from the startup of a moving-picture content display program, and viewpoint positions A1, A2, ... indicate viewpoint positions to be selected at each time Tn. In coordinates taking a reference position P of an object or the like as the center thereof as shown in FIG. 6(b), the viewpoint position is set as An=(x, y). In FIG. 6(a), sight line directions B1, B2, ... indicate direction of sight line to be selected at each time Tn. Vector data (Vx, Vy) is applicable to the sight line direction as shown in FIG. 6(b), for example. Angles of view C1, C2, ... indicate view angles to be selected at each time Tn. Angle data (θ) is applicable to the view angle data as shown in FIG. 6(b), for example. It should be noted that the example shown in FIG. 6(b) is an example of information structure in a two-dimensional plane but each of the above data can be structured as three-dimensional data.

In case moving-picture data are displayed on a user's display according to the preset picture display program shown in FIG. 6(a), pictures having viewpoint positions, sight line directions and angles of view been set according to the program are displayed as the time elapses from the startup of the program. The elapsed time may be measured by a timer or the like but ID data such as frame number or the like as additional information set for each frame of a content may be correlated with a reproduction time. In case picture data are reproduced at a rate of a specified number of frames (n frames) per a predetermined time (sec), the elapsed time can be measured for a number of frames to be reproduced.

For example, in case only one selected from the five pictures having been taken by the five cameras as shown in FIG. 2 can be displayed, a viewpoint position, sight line direction and view angle of one the five cameras are taken as program setting information. For pre-storing or pre-distributing, or for synthesizing, in the user's system a picture between actually taken pictures, for example, an all-directional (360-degree) picture, not only the viewpoint position, sight line direction and view angle of a camera actually used but other positional information are taken as the program setting information, and the picture is displayed on the user's display according to the program setting information.

In the system according to the present invention, when moving-picture data having been taken from different points of view are read from a storage medium, or selected from distributed data, for display on the user's display, there can be made at any time a selection between the manual mode in which a picture designated based on designation information such as a viewpoint position designated by the user is selected, or synthesized, for display, and the present mode in which moving-picture information having been taken from different viewpoints are selected one after another for display.

The picture display controller according to the present invention, which reproduces, for display, moving pictures received from a network or read from a storage medium will be described concerning an example construction thereof with reference to FIG. 7.

Figure 7:
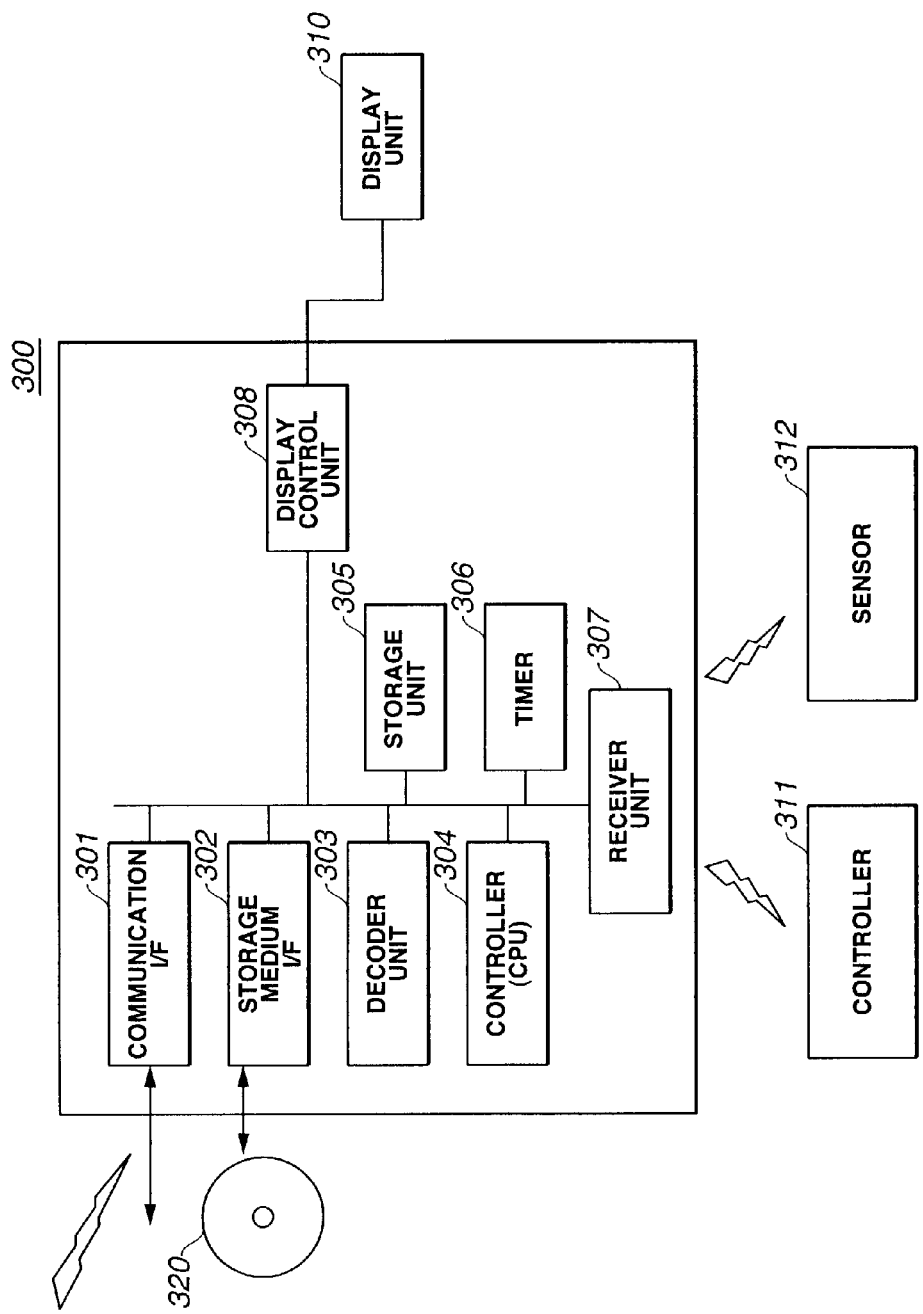
FIG. 7 is a block diagram of an example construction of the picture display controller according to the present invention.

In FIG. 7, the picture display controller is generally indicated with a reference 300. As shown, the picture display controller 300 includes a communication interface (I/F) 301 to receive data distributed via the Internet or data broadcast from a broadcasting station. Thus, the picture display controller 300 can receive a content including moving pictures having been taken from different viewpoints such as a panoramic picture, full-celestial moving picture or the like sent from a picture provider site. The system 300 also includes a storage medium interface (I/F) 302 which provides a data transfer interface between the system 300 and a storage medium 320 such as DVD, flash memory or the like. That is, the interface 302 is provided to take, from the storage medium 320 into the system 300, the content including the moving pictures having been taken from different viewpoints.

In many cases, a content sent from a picture provider site, or a content stored in the storage medium 320, has been coded in order to reduce the data amount in it. Therefore, the content is decoded in a decoder 303 before displayed on a display unit 310 under the control of a display control unit 308.

For display of moving-picture data in the preset mode in which the data is displayed according to a display program preset for the moving picture, one whose parameters such as a viewpoint, sight line direction and view angle correspond to those in the set display program is selected or synthesized from the moving-picture data having been taken from different points of view, and displayed on the display unit 310.

On the other hand, for display of moving-picture data in the manual mode in which a designated picture is selected or synthesized based on user-defined information such as a viewpoint etc., a picture to be displayed is selected or synthesized, for display on the display unit 310, based on control information such as the viewpoint etc. from the picture has been taken, user's command entered at a controller 311 or directional data entered from a sensor 312 such as a view angle information acquisition device or the like.

The picture display controller 300 also includes a receiver unit 307 which receives a signal (e.g., infrared signal) sent from the controller 311 or sensor 312 and supplies it to a control unit (CPU) 304. A signal sent from the controller 311 or sensor 312 is information to designate a picture to be displayed. For example, the signal is information to set a position where a panoramic picture of full-celestial moving picture is to be displayed. It includes information corresponding to each of viewpoint position (A), sight line direction (B), view angle (C1) and other setting data (D) included in the preset picture display program having been described above with reference to FIG. 6.

The sensor 312 is a head tracker or the like whose angle sensor such as a triaxial gyro is attached on the user's head to detect a user's direction of sight line as angle information. Thus the sensor 312 supplies the picture display controller 300 with viewpoint position information corresponding to a user's viewing direction. The picture display controller 300 converts information entered by the user at the controller 311 or input information from the sensor 312 into similar parameters to those in the preset picture display program having been described above with FIG. 6, and selects or synthesizes moving-picture data whose viewpoint position, sight line direction and view angle correspond to the set parameters for display on the display unit 310.

Note that the sensor 312 uses the above triaxial gyro but it may be a one to acquire data such as a user's direction of sight line by taking a picture of the user's face and analyzing the picture having thus been taken. In the latter case, data such as the user's direction of sight line acquired through the picture analysis is supplied to the picture display controller 300.

The storage unit of the picture display controller 300 is used to store received data, a variety of processing programs and preset picture display program or as a work area for the CPU 304. Namely, the storage unit is formed from a RAM, ROM and the like. The picture display controller 300 further includes a timer 306 to measure an elapsed time from startup of the picture display program.

Figure 8:
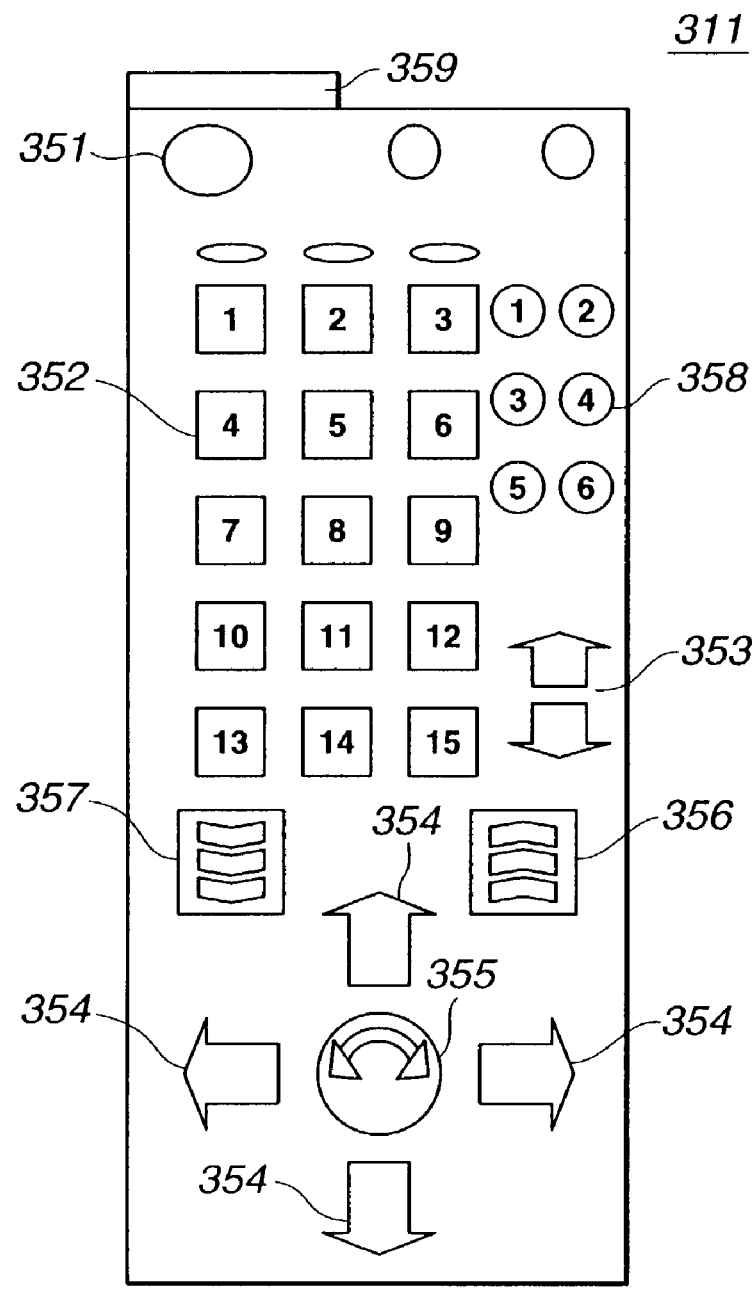
FIG. 8 shows an example design of the controller in the picture display controller according to the present invention.

FIG. 8 shows an example design of the controller 311. As shown, the controller 311 includes a power switch 351, content select switch 352, sound volume setter 353, viewpoint move unit 354, sight line direction setter 355, zoom-in setter 356, zoom-out setter 357 and a camera selector 358.

The controller 311 has provided at the front thereof a data transmitter (e.g., infrared emitter) 359 to send data set on the basis of an operation of each control on the controller 311 as a processing command (viewpoint setting command). The data is received by the receiver unit 307 of the picture display controller 300, and set as parameters such as viewpoint position, sight line direction, view angle and the like of the picture. A picture is selected or synthesized based on the parameters and displayed on the display unit 310.

A setting made in the viewpoint move unit 354, setting made in the sight line direction setter 355 and a setting made in the zoom-in setter 356 are sent as a viewpoint position parameter, sight line direction parameter and view angle parameter, respectively, to the picture display controller 300. It should be noted that the design of the controller 311 shown in FIG. 8 is just an example but the controller 311 may be designed otherwise. For example, the controller 311 may be provided with a control such as a joystick and be designed to provide a variety of information such as viewpoint position, sight line direction, view angle and others corresponding to operations of the joystick.

Figure 9:
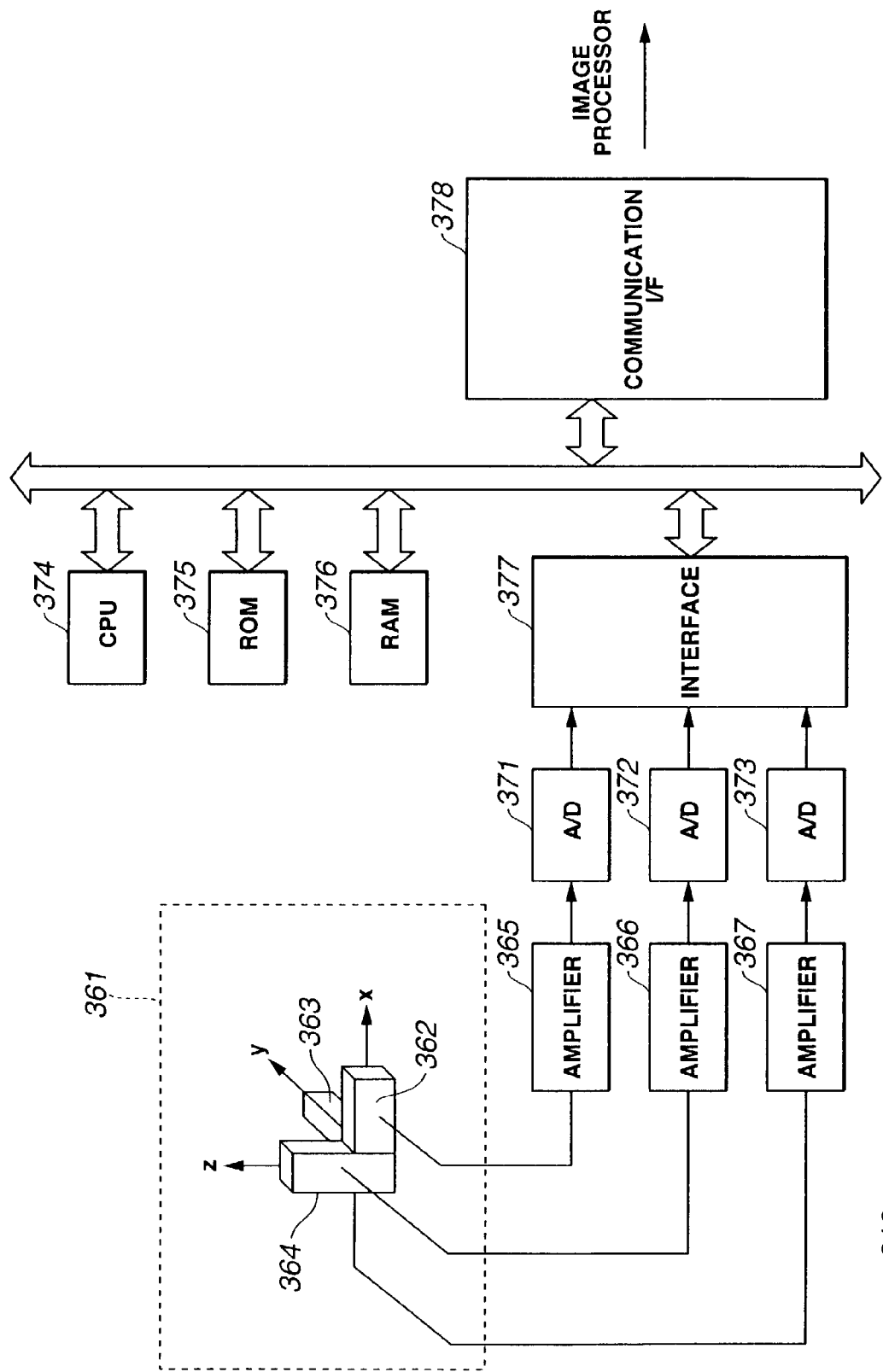
FIG. 9 is a block diagram showing an example design of the sensor in the picture display controller according to the present invention.

FIG. 9 is a block diagram showing in detail an embodiment of the sensor 312. As shown, the sensor 312 includes a triaxial gyro unit 361 as a displacement detecting means. The triaxial gyro unit 361 includes gyros 362, 363 and 364 corresponding to the X, Y and Z axes. The triaxial gyro unit 361 has such a characteristic that when applied with a rotation angular velocity, an oscillating object generates a Coriolis force F ($=2$ mvω where m is a mass, v is a velocity and ω is an angular velocity) orthogonally to the oscillation. The angular velocity ω is proportional to the Coriolis force F, so that detection of a Coriolis force F will makes it possible to detect a rotation angular velocity.

Each of the gyros 362, 363 and 364 includes a driving piezoelectric porcelain and detecting piezoelectric porcelain (not shown). The driving piezoelectric porcelain is applied with an alternating signal which is an oscillation output of an oscillator. When the gyro is rotated with an alternating signal applied to the porcelain, the latter is applied with a Coriolis force F to produce a voltage E.

Small voltages generated by the detecting piezoelectric porcelains of the gyros 362, 363 and 364 are amplified by amplifiers 365, 366 and 367, respectively, and converted into digital data by A/D converters 371, 372 and 373, respectively.

The angular velocity ω applied to each of the gyros 362, 363 and 364 is proportional to the voltage E thus produced. Therefore, the gyros 362, 363 and 364 are located so that as the gyro 362, for example, is rotated clockwise about the X axis, the voltage E becomes higher while counterclockwise rotation of the gyro 362 will cause the voltage E to be lower.

The sensor 312 also includes an interface 377 which supplies detection signals from the triaxial gyro unit 361, supplied from the A/D converters 371, 372 and 373, to a CPU (central processing unit) 374 via a bus. The CPU 374 acquires, based on the detection signals from the triaxial gyro unit 361, supplied via the bus, angle data including a roll angle, pitch angle and a yaw angle, and X-, Y- and X-directional oscillation characteristic data.

The CPU 374 as the computing means stores angle data such as the computed roll angle, pitch angle and yaw angle and the X-. Y- and X-directional oscillation characteristic data into a RAM 376 via a bus, makes a computation for conversion of the stored data into operation information, and supplies the operation information obtained by the conversion to the picture display controller 300 via a communication interface 378. The sensor 312 also includes a ROM (read-only memory) 375 which stores a program to be executed by the CPU 374 or fixed data as computation parameters. The operation information acquired through the conversion by the CPU 374 is stored into a RAM (random-access memory) 376 as necessary. Also, the RAM 376 is used as a storage area and work area for the program to be executed in the processing by he CPU 374 and parameters appropriately variable in the program processing.

The communication interface 378 provides a wireless communication by infrared light for example with the receiver unit 307 in the picture display controller 300 to produce picture setting command information generated based on the result of computation from the CPU 374 and motion of the triaxial gyro unit 361.

Receiving various setting command information (will be referred to as "viewpoint setting command" hereunder) such as viewpoint position, sight line direction, view angle, etc. of a picture from the controller 311 or sensor 312, the picture display controller 300 will select or synthesize a picture according to the received command. As having previously been described, the picture display controller according to the present invention works in any of the manual mode in which a viewpoint position etc. of a picture are set according to user-defined information and the preset mode in which a picture is outputted according to a program preset according to a picture.

Even if the picture display controller 300 is in the preset mode when reception of a viewpoint setting command from the controller 311 or sensor 312 has been detected, it will shift to the manual mode and display a picture whose parameters such as viewpoint position, sight line direction, view angle and the like correspond to those which are based on the viewpoint setting command from the controller 311 or sensor 312. In case the picture display controller 300 is already in the manual mode when reception of a viewpoint setting command for a picture from the controller 311 or sensor 312 has been detected, it will continuously be in the manual mode and display a picture whose parameters such as a viewpoint position, sight line direction, view angle and the like correspond to those which are newly received from the controller 311 or sensor 312.

Further, if the picture display controller 300 being in the manual mode has not received any viewpoint setting command for a new picture from the controller 311 or sensor 312 for a predetermined time (threshold time: Ta), it will shift from the manual mode to the preset mode. The time is measured by the timer 306 of the picture display controller 300 shown in FIG. 7.

Figure 10:
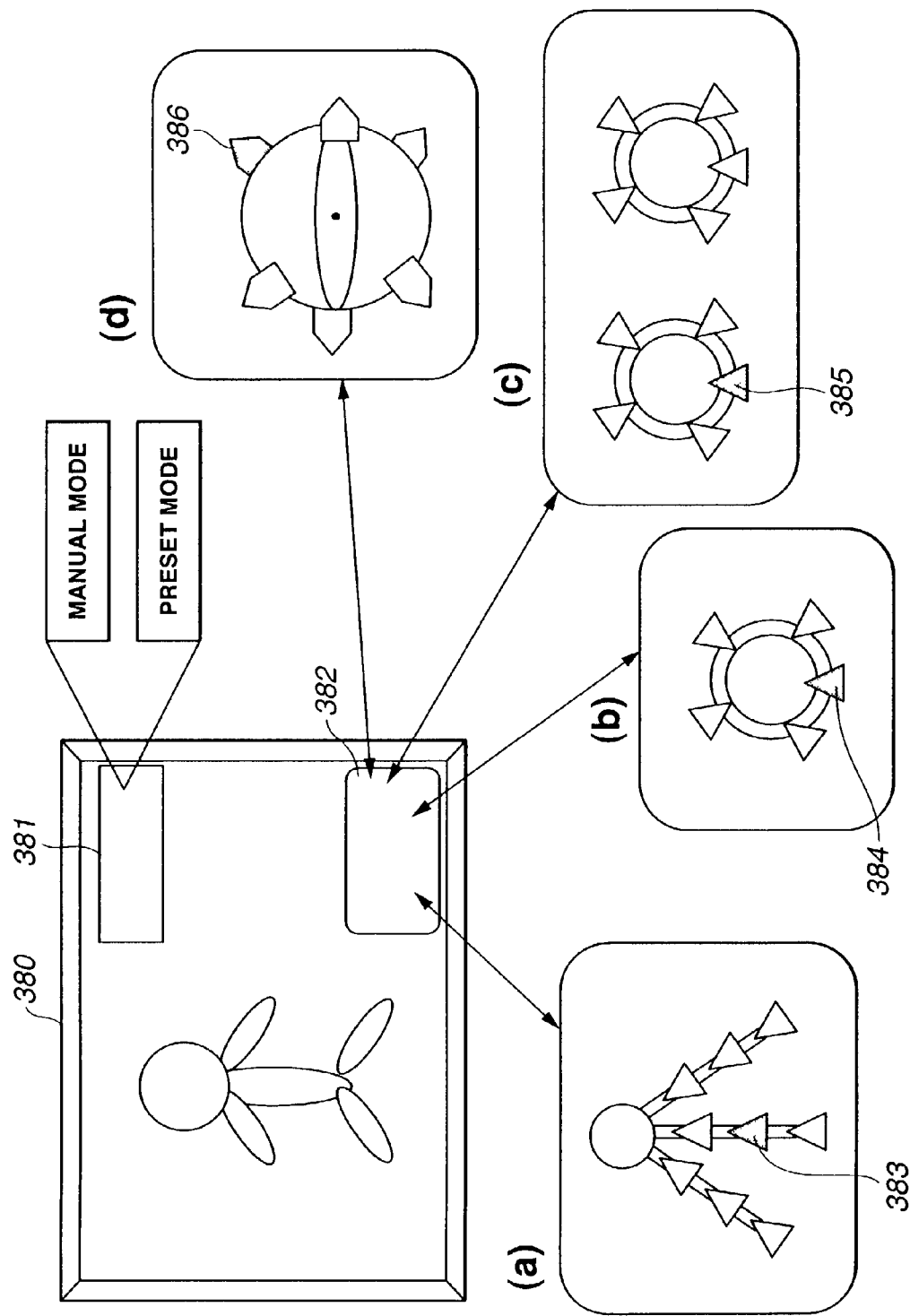
FIG. 10 shows an example picture display in the picture display controller according to the present invention.

FIG. 10 shows an example picture display on a picture display unit 380 under the control of the controller 311. In an upper right display area 381 of the display unit 380, there is displayed information indicating whether the current mode is the manual or preset mode. In a lower right area 382 of the display unit 380, there is displayed information indicating a viewpoint position from which the currently displayed picture has been taken. For example, camera site information shown in FIG. 10(a) shows that the picture being displayed on the display unit 380 is selectable from pictures having been taken from the cameras located in relation to an object as having previously been described with reference to FIG. 3 and it is a one having been taken from a position nearly corresponding to a camera 383. Camera site information shown in FIG. 10(b) shows that the picture being displayed on the display unit 380 is selected from pictures having been taken from the cameras located through 360 degrees around an object as having previously been described with reference to FIG. 2 and it is a one having been taken from a position nearly corresponding to a camera 384. Camera site information shown in FIG. 10(c) shows that the picture being displayed on the display unit 380 is selected from pictures having been taken from the cameras located through 360 degrees around two objects, respectively, as having previously been described with reference to FIG. 4 and it is a one having been taken from a position nearly corresponding to a camera 385. Camera site information shown in FIG. 10(d) shows that the picture being displayed on the display unit 380 is selected from pictures of an object having been taken by the cameras located through 360 degrees in a plane around an object, or laid for full-celestial photography, as having previously been described with reference to FIG. 5 and it is a one having been taken from a position nearly corresponding to a camera 386.

Note that also the camera site information on the camera location having previously been described with reference to FIG. 5 for taking pictures of an object by cameras located through 360 degrees in a plane can be presented as a similar camera location to those shown in FIGS. 10(a), 10(b) and 10(c). In this case, however, the cameras will be illustrated as directed outward.

Operating the controls on the controller 311 for example, the user can select any desired one of these viewpoint positions. For example, operating the viewpoint move unit 354 on the controller 311 shown in FIG. 8, the nine camera sites can be selected one after another in the camera site plan shown in FIG. 10(a). The five camera sites can be selected one after another in the camera site plan shown in FIG. 10(b). The ten camera sites can be selected one after another in the camera site plan shown in FIG. 10(c). Also, the cameras at the number n of sites can be selected one after another in the camera site plan shown in FIG. 10(d).

Figure 11:
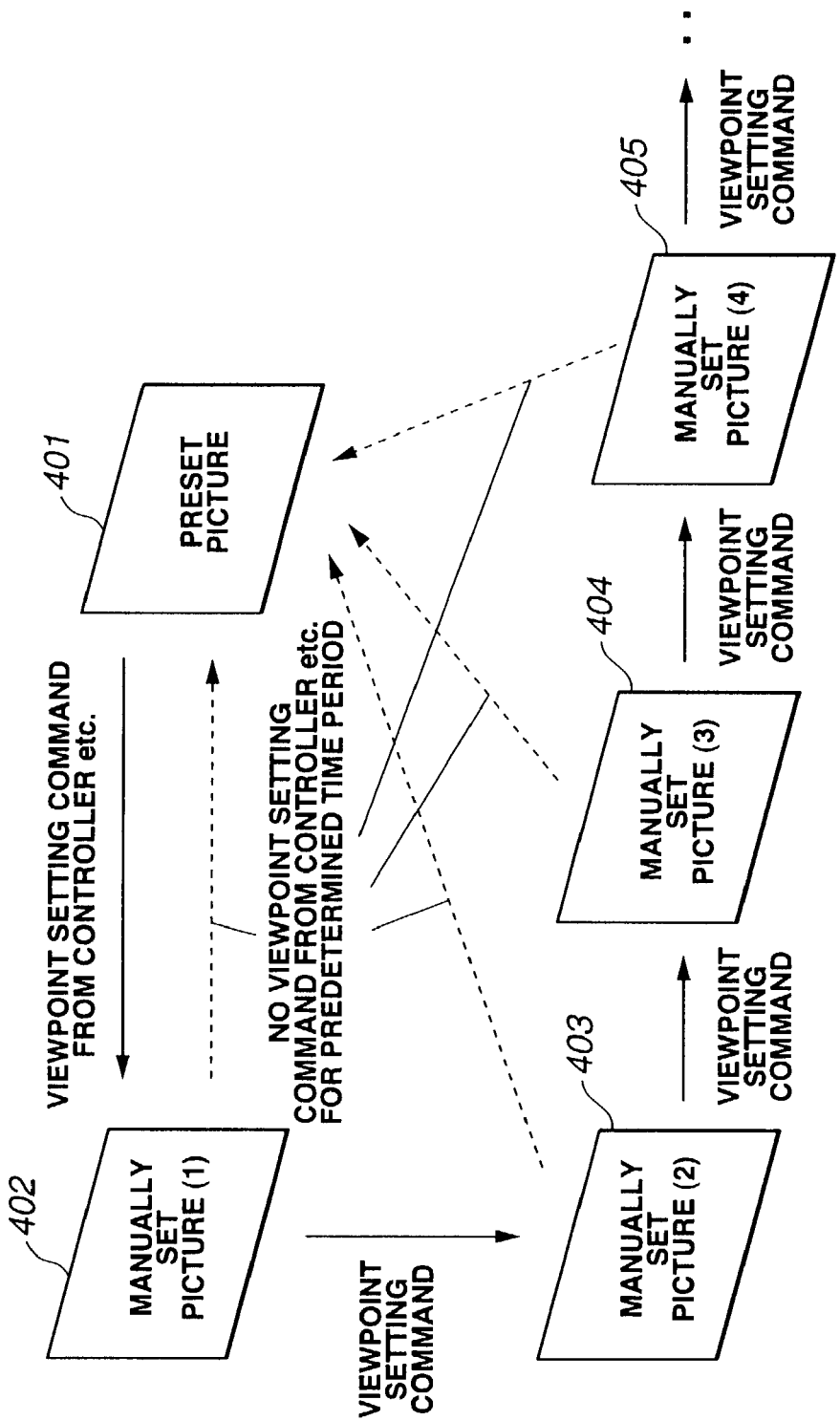
FIG. 11 explains the mode shift in the picture display controller according to the present invention.

FIG. 11 explains the shift or switching between the manual and preset modes in the picture display controller 300 according to the present invention. FIG. 11 shows a preset picture 401 as an output picture for which there are set a viewpoint position, sight line direction, view angle, etc. corresponding to those in a program preset for the picture, and a manually set picture 402 for which there are a viewpoint position, sight line direction, view angle, etc. according to a viewpoint setting command from the controller 311 or sensor 312. Based on an input from the controller 311, shift will be made from the preset picture 401 to the manually set picture 402. Also, when no viewpoint setting command for any new picture has been received from the controller 311 or sensor 312 for a predetermined time (threshold time: Ta), shift will be made from the manually set picture 402 to the preset picture 401.

Upon reception of a viewpoint setting command for a new picture from the controller 311 or the like within the predetermined time (threshold time: Ta) in the course of displaying the manually set picture 402, there will be displayed a manually set picture 403 whose parameters such as a viewpoint position, sight line direction, view angle and the like correspond to new ones received from the controller 311 or the like. When no viewpoint setting command for any new picture has been received from the controller 311 or the like for the predetermined time (threshold time: Ta) while the manually set picture 403 is being displayed, the display shifts from the manually set picture 403 to the preset picture 401. Upon reception of a viewpoint setting command for a new picture from the controller 311 or the like within the threshold time (Ta), there will be displayed a manually set picture 404 based on the new viewpoint setting command. Subsequently, upon reception of a viewpoint setting command for a new picture from the controller 311 or the like within the threshold time Ta, similar shift will be made to display of a manually set picture 405.

Thus in the picture display controller 300 according to the present invention, a picture based on a user-defined viewpoint setting command can be set at any time. In case any viewpoint setting command is not entered for a predetermined time, the picture display controller will shift to the preset mode, so that it is possible to make a user's setting effective only for a picture portion in which the user is interested and any monotonous picture will not be displayed whose last set viewpoint position is fixed as a viewpoint setting command.

Figure 12:
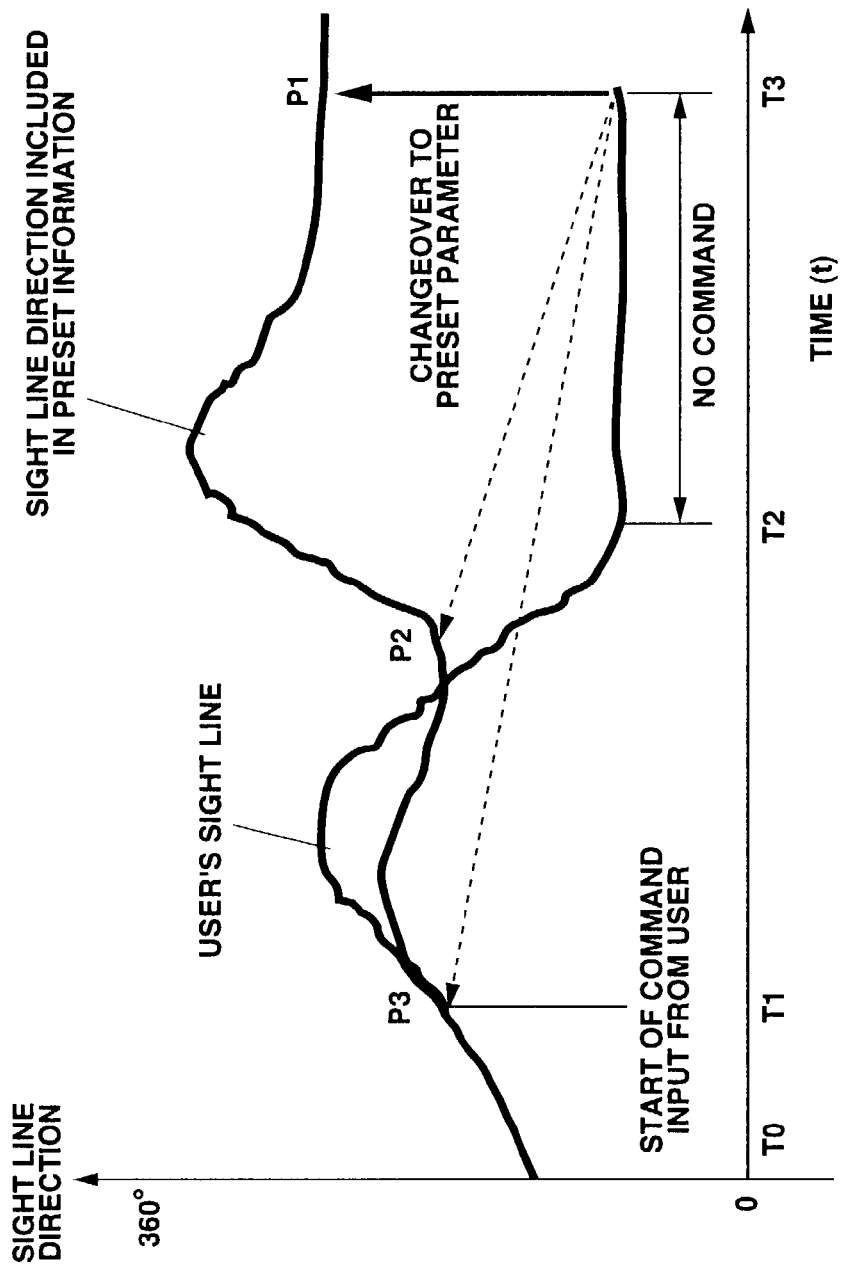
FIG. 12 shows the mode shift with time elapse in the picture display controller according to the present invention.

FIG. 12 shows the shift between the manual and preset modes with time elapse in the picture display controller according to the present invention. In FIG. 12, the horizontal axis indicates a time (t) and vertical axis indicates a sight line direction. FIG. 12 shows only sight line direction data, but a viewpoint position and view angle are also processed in the same sequence as for the sight line.

First, there is entered no viewpoint setting command from the controller 311 for a period from a time T0 to a time T1. For this period, a picture is displayed in the preset mode on the basis of a sight line direction set therefore. Upon transmission of a viewpoint setting command by the user from the controller 311 or sensor 312 at the time T1, shift will be made from the preset mode to the manual mode. Subsequently, the manual mode will last until a time T2, or a viewpoint setting command will intermittently be sent by the user from the controller 311 or sensor 312 and the manual mode will last, and a picture having been taken from another sight line direction will be displayed based on a viewpoint setting command.

When there has been entered no viewpoint setting command from the controller 311 for a period from the time T2 to a time T3 and it is determined that the time for which no command has been entered has reached the threshold time Ta, shift will be made from the manual mode to the preset mode in which there will be displayed a picture whose sight line direction corresponds to a sight line direction parameter preset to the picture.

Note that when it is determined at the time T3 that the time for which no command has been entered has reached the threshold time Ta, a picture will be displayed on the display unit in the preset mode. At this time, various shift points can be set in a frame of a picture display frame according to parameter settings; shift point P1 at which the frame temporally lasts down to an end time of the manual mode (T=T3), P3 at which the preset mode is shifted to the manual mode, or P2 which is a breakpoint between a plurality of music pieces forming a content for example.

Figure 13:
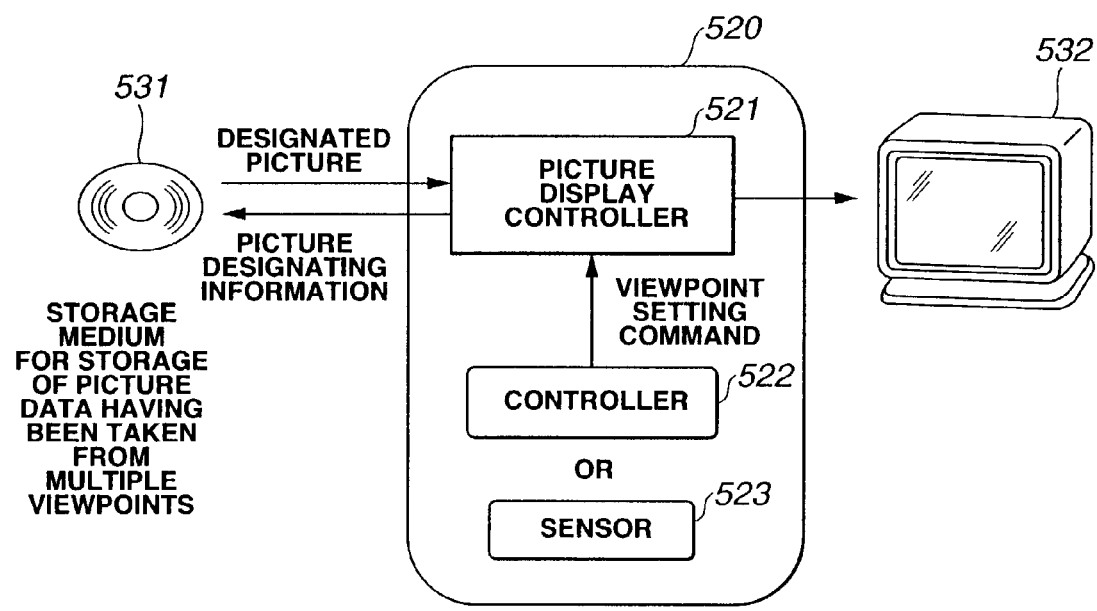
FIG. 13 explains an example data processing for reproduction of a content read from a storage medium in the picture display controller according to the present invention.
Figure 14:
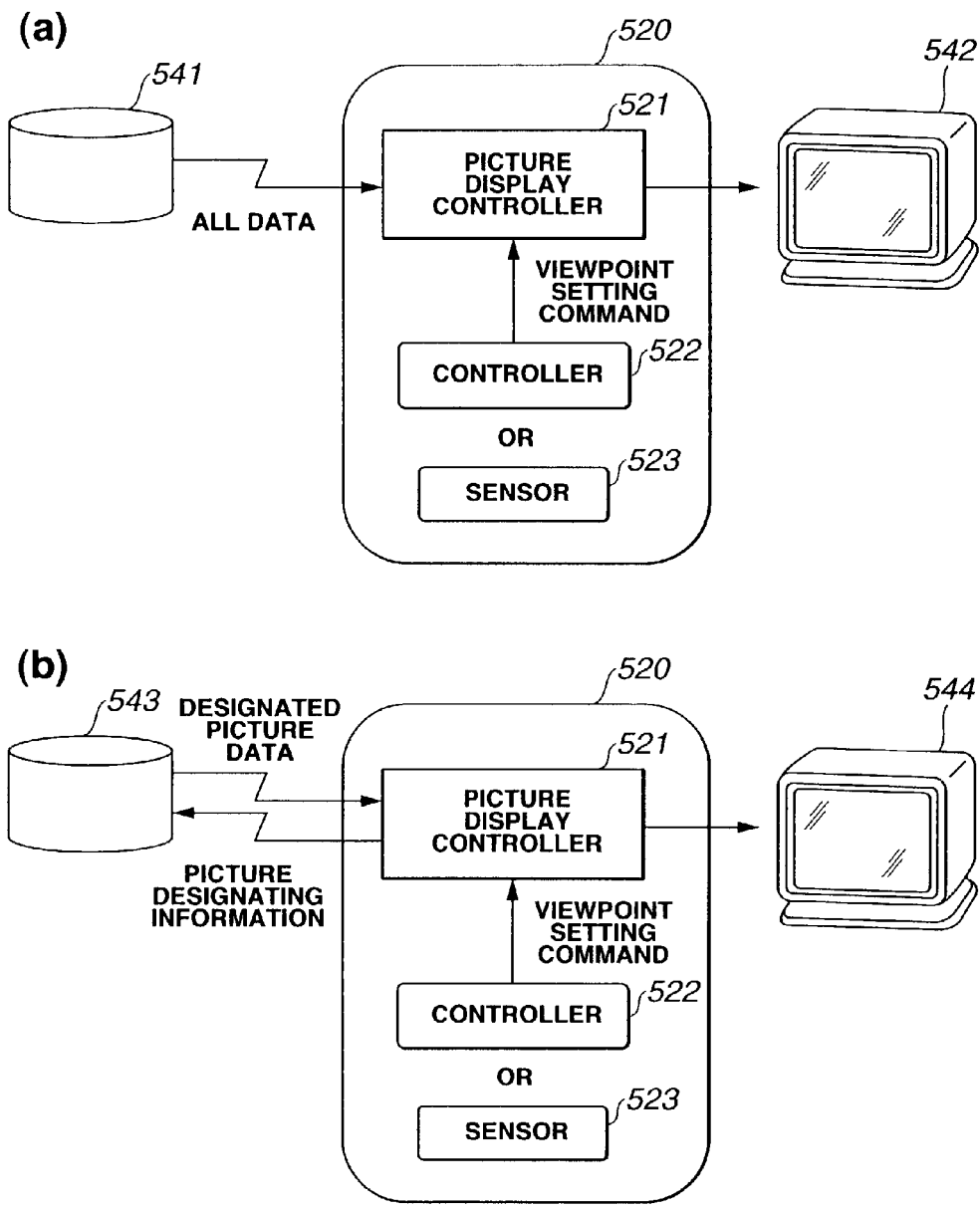
FIG. 14 explains an example data processing for reproduction, in the picture display controller according to the present invention, of a content received from a server.

The picture display on the display unit will be described concerning a picture read from a storage medium as shown in FIG. 13 and a content received from a server as shown in FIG. 14, respectively.

FIG. 13 explains an example design of a picture display system in which a user system 520 including a picture display controller 521 and a controller 522 or sensor 523 reads a picture from a storage medium 531 such as DVD, CD or the like for display on a display unit 532.

In the picture display system of this design, when a content to be reproduced is designated for a preset-mode picture at the picture display controller 521 or controller 522, a preset picture display program for the designated content is read from the storage medium 531 and stored into a storage unit (storage unit 305 in FIG. 7) in the picture display controller 521. Also, information on a plurality of pictures having been taken from different viewpoints, included in the content, is acquired in combination, and stored into the storage unit in the picture display controller 521. These pieces of information include information about the pictures having been taken from all directions (360 degrees) as having previously been described with FIG. 2 and information about the nine camera sites having previously been described with reference to FIG. 3. These pieces of information are displayed as control information in each of the display modes having previously been described with reference to FIG. 10 when the content is displayed on the display unit 532.

First, reproduction of the content is started under the control of the preset picture display program stored in the storage unit, picture data whose viewpoint position, sight line direction, view angle and the like correspond to the parameters set in the preset picture display program is read from the storage medium 531, and displayed on the display unit 532.

Subsequently, when a viewpoint setting command is supplied from the controller 522 or sensor 523 to the picture display controller 521, the latter will select pictures whose parameters such as viewpoint position, sight line direction, view angle and the like are most approximate to those included in the received viewpoint setting command to read, from the storage medium 531, a picture whose viewpoint position, sight line direction, view angle and the like correspond to those included in the viewpoint setting command, and acquire corresponding picture data from the storage medium 531 according to the designated information on the selected picture.

In case 360-degree picture data is stored in the storage medium, for example, picture data whose view angle completely corresponds to a freely designated one in the viewpoint setting command can be read from the storage medium 531. However, in case the storage medium 531 has stored therein only pictures having been taken by the five cameras as having previously been described with reference to FIG. 2, a picture whose viewpoint position, sight line direction and view angle are most approximate to those in the viewpoint setting command will be acquired and displayed. It should be noted that in the picture display controller 521, an inter-camera picture may be produced by the view interpolation or the like from pictures having been taken by a plurality of cameras as having been described in the foregoing. In this case, picture data having been taken from a plurality of different viewpoint positions belong to the same frame are recalled from the storage medium, a picture whose viewpoint position, sight line direction and view angle corresponding to those included in the viewpoint setting command is produced in the picture display controller 521, and the picture thus produced is displayed on the display unit 532.

FIG. 14(*a*) explains an example design of a picture display system in which the user system 520 including the picture display controller 521 and controller 522 or sensor 523 receives picture data having been taken from a plurality of different viewpoints from a server 541 via a network for display on the display unit 532.

In this picture display system design, all the picture data having been taken from the plurality of different viewpoints are distributed from the server 541 to the picture display controller 521 and stored into a storage unit (storage unit 305 in FIG. 7) of the picture display controller 521. The picture data include information about the pictures having been taken from all directions (360 degrees) as having previously been described with FIG. 2 and information about all the nine camera sites having previously been described with reference to FIG. 3. Also, a preset picture display program for a content is sent from the server 541 to the picture display controller 521 and stored into the storage unit. Also, information on a plurality of pictures having been taken from different viewpoints, included in the content, is acquired in combination, and stored into the storage unit in the picture display controller 521. These pieces of information are displayed as control information in each of the display modes having previously been described with reference to FIG. 10 when the content is displayed on the display unit 532.

First, reproduction of the content is started under the control of the preset picture display program stored in the storage unit, picture data whose viewpoint position, sight line direction, view angle and the like correspond to the parameters set in the preset picture display program is read from the storage medium 305 in the to-be-displayed controller 300, and displayed on the display unit 532.

Subsequently, when a viewpoint setting command is supplied from the controller 522 or sensor 523 to the picture display controller 521, the latter will select pictures whose parameters such as viewpoint position, sight line direction, view angle and the like are most approximate to those included in the received viewpoint setting command to read, from the storage medium 305, a picture whose viewpoint position, sight line direction, view angle and the like correspond to those included in the viewpoint setting command, and acquire corresponding picture data from the storage medium 305 according to the designated information on the selected picture. In this case, an inter-camera picture may be produced by the view interpolation or the like as having been described in the foregoing.

FIG. 14(b) explains an example design of a picture display system in which picture data having been taken from a plurality of different viewpoints are received from a server via a network as in the system design shown in FIG. 14(a). In this system, however, only picture data having been taken from a viewpoint designated by the picture display controller 521 is distributed from the server 543 to the picture display controller 521.

Upon request for a content from the picture display controller 521, picture data whose viewpoint corresponds to a special one in the preset picture display program is sent to the picture display controller 521 in the user system 520, and the picture display controller 521 sends the received data to a display unit 544. It should be noted that information on pictures having been taken from a plurality of different viewpoints, included in the content, is also sent from the server 543 to the picture display controller 521 and control information having previously been described with reference to FIG. 10 will be displayed on the display unit 544 according to the received information.

Subsequently, when a viewpoint setting command is supplied from the controller 522 or sensor 523 to the picture display controller 521, the latter will send, to the server 543, any of a viewpoint setting command, information on a viewpoint position, sight line direction and view angle calculated based on a command, or picture designation information selected based on the viewpoint position, sight line direction and view angle to the server 543 in order to acquire a picture whose viewpoint position, sight line direction and view angle correspond to those in the received viewpoint setting command.

The server 543 selects picture display data based on the information received from the picture display controller 521, and sends the data to the picture display controller 521. It should be noted that in case the storage medium has stored there 360-degree picture data, the server 543 can extract and send picture data whose view angle completely corresponds to a freely designated by the viewpoint setting command. In case the server 543 holds therein only a picture having been taken by a camera in a limited site, a picture whose viewpoint position, sight line direction and view angle are most approximate to those in the viewpoint setting command is acquired and sent.

Note that the aforementioned production of an inter-camera picture by the view interpolation or the like based on pictures having been taken by a plurality of cameras may be done in the server 543 and picture data conforming to information designated by a viewpoint setting command is produced and sent to the user system 520. Also, the picture synthesis may be done in the picture display controller 521. In this case, the server 543 selects pictures having been taken from a plurality of different view points belonging to the same frame and required fro the process of synthesis, and send the picture data to the user system 520. In the picture display controller 521 in the user system 520, a picture whose viewpoint position, sight line and view angle correspond to those in the viewpoint setting command may be produced and displayed on the display unit 544.

Figure 15:
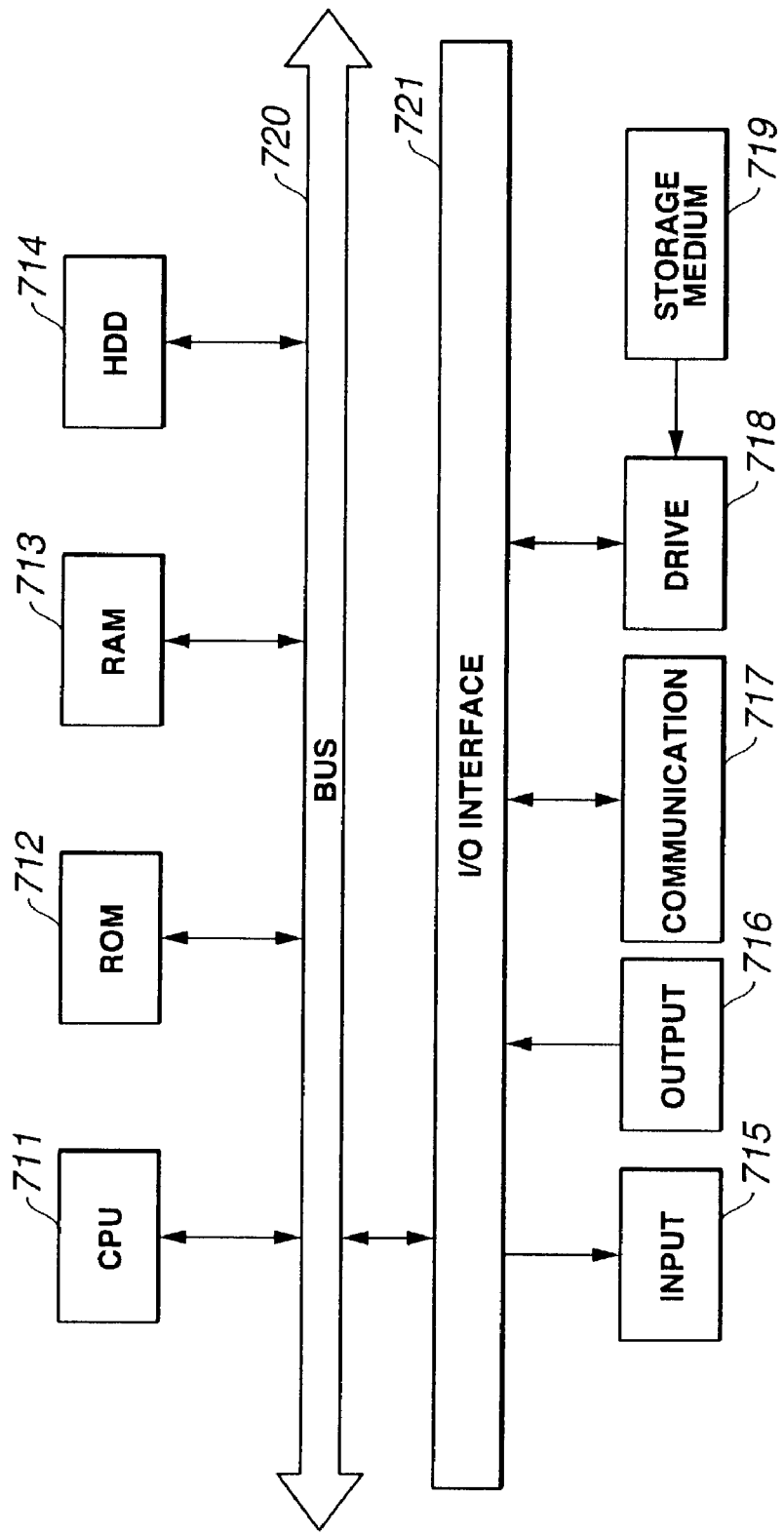
FIG. 15 explains an example design of the server which provides a content to be processed in the picture display controller according to the present invention.

FIG. 15 shows an example design of a picture server. As shown, the server includes a CPU (central processing unit) 711 to execute a variety of application programs and OS (operating system), a ROM (read-only memory) 712 to store a program to be executed by the CPU 711 or fixed data as computation parameters and a RAM (random-access memory) 713 used as a storage area and work area for a program to be executed in a processing by the CPU 711 and parameters appropriately variable in the program processing.

Further, the server includes a HDD (hard disc drive) 714 to control the hard disc for storage and read of various data and programs to and from the hard disc, a bus 720 formed from a PCI (peripheral component Internet/Interface) bus or the like to permit data transfer to and from each input device via an input/output interface 721.

The server also includes an input unit 715 formed from a keyboard, pointing device or the like for example to enter various commands and data to the CPU 711, and an output unit 716 which is a CRT, liquid crystal display (LCD) or the like to display a variety of information by text or image.

The server further includes a communication unit 717 to make two-way communication with user sites. It transmits data supplied from each storage unit or data processed by the CPU 711 and receives control information from the user site under the control of the CPU 711.

The server also includes a drive 718 to write and read data to and from recording medium 719 such as a floppy disc, CD-ROM (compact disc-read-only memory), MO (magneto-optical disc), DVD (digital versatile disc), magnetic disc, semiconductor memory or the like. It reads a program or data from the recording medium 719 and writes a program or data to the recording medium 719.

To read a program or data from the storage medium and execute or process it in the CPU 711, the read program or data is supplied to the RAM 713 via the input/output interface 721 and bus 720. The server receives picture designation information from the picture display controller at the user site, packetizes the designated picture and sends it to the user site.

Figure 16:
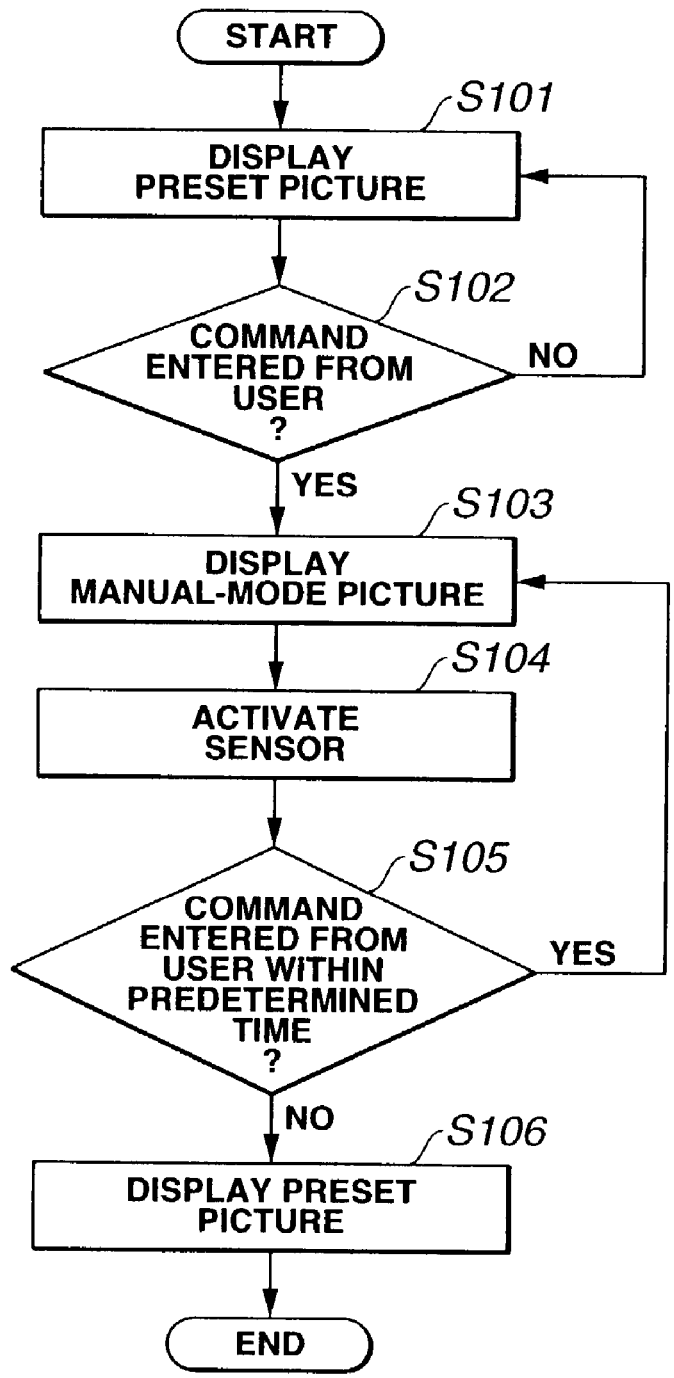
FIG. 16 shows a flow of operations made in the mode shifting during display of a content in the picture display controller according to the present invention.

FIG. 16 shows a flow of operations made in picture selection, that is, the mode shift between the preset and manual modes in the picture display controller according to the present invention. Each step of the operation flow will be described below with reference to FIG. 16.

In step S101, a picture selected according to a preset picture display program for a picture read from the storage medium or distributed from the server or the like, that is, a preset picture, is first displayed on the display unit. In step S102, it is determined whether a user command has been entered, which is intended to determine whether a viewpoint setting command has been received from the controller or sensor.

When no user command has been entered, the display of the preset picture is continuously made. When a user command has been entered, the operation goes to step S103 where a picture having been taken from a viewpoint, sight line direction, view angle and the like conforming to the command, namely, a manual-mode picture, will be displayed on the display unit based on a viewpoint setting command from the controller or sensor.

At start of displaying the manual-mode picture, the timer is set to ON in step S104. In step S105, the elapsed time from the entry of the last viewpoint setting command from the controller or sensor is compared with a predetermined time (threshold time: Ta). In case a new viewpoint setting command is received within the threshold time (Ta)m display of a picture whose viewpoint position, sight line direction, view angle and the like correspond to those in the command, that is, a manual-mode picture, will continuously be done as in step S103.

If no new viewpoint setting command has been entered within the threshold time (Ta), the operation goes to step S106 where a picture selected according to the preset picture display program, that is, a preset picture, will be displayed on the display unit. It should be noted that as having previously been described with reference to FIG. 12, a content picture is displayed when the manual mode shifts back to the preset mode in such a manner that a frame picture continued to the end frame in the manual mode is displayed, a preset picture is displayed again at the start point or a picture is displayed again at a point such as a breakpoint between music pieces, according to preset setting information. It should be noted that the shift of the manual mode to the preset mode will occur also when the controller has issued a mode shift command and the picture display controller has received the mode shift command, which is not shown in the flow chart in FIG. 16.

In the foregoing, the present invention has been described concerning the preferred embodiments thereof. Evidently to those skilled in the art, however, the present invention can be modified in various forms without departing from the scope and spirit thereof defined in the claims which will be given later. That is, the embodiments of the present invention have been presented just as examples and should not be interpreted as limitative ones. The subject matter of the present invention will be definitely evident from the claims.

Note that the sequence of operations having been described in the specification can be effected by the hardware or software or by a combination of them. For using the software to this end, a program including the recorded sequence of operations can be installed in a memory in a computer incorporated in a dedicated hardware and executed by the computer. Otherwise, the program can be installed in a general-purpose computer capable of various kinds of processing and executed by the computer.

For example, the program can be pre-recorded in a recording medium such as a hard disc or ROM. Otherwise, the program can be recorded (stored) provisionally or permanently in a removable recording medium such as a floppy disc, CD-ROM, MO, DVD, magnetic disc or semiconductor memory. Such a removable recording medium can be served as a so-called package software to the user.

Note that the program can be installed from the above-mentioned removable recording medium into a computer as above, it can also be transferred to a computer in a wireless manner from a download site, transferred to a computer via a network such as LAN (local area network) or Internet in a wired manner and the computer can receive the program thus transferred thereto and install it into a recording medium such as a built-in hard disc or the like.

Note that various kinds of operations referred to herein can be done in a time series according to the description and also may be done in parallel or individually depending upon the capability of an apparatus which is to execute the operations or as necessary. The system referred to herein is a logical set of a plurality of apparatuses and not limited to any logical set whose components are not provided in the same enclosure.

As having been described in the foregoing, when reading moving-picture data having been taken from different viewpoints from a storage medium or receiving the data distributed from a server via a network such as the Internet or the like or a broadcasting network and displaying it on the display unit, the present invention permits to select, at any time, either the manual mode in which a picture is selected or synthesized based on designated information such as viewpoint position included in a viewpoint setting command from the controller operated by the user or from the sensor such as head tracker and displayed or the preset mode in which moving-picture data having been taken from different viewpoints are selected one after another according to a picture display program preset for a moving picture and displayed.

Further, in the picture display controller according to the present invention, a picture whose imaging parameters conform to a user-defined viewpoint setting command can be set at any time, and since the manual mode is shifted to the preset mode if no viewpoint setting command has been entered for a predetermined period, the user-defined command can be made effective only for a region of a picture the user is interested in and any monotonous picture limited to the last set viewpoint position as a viewpoint setting command will not be displayed.

What is claimed is:

1. A picture display controller for outputting, to a display unit, a picture taken from a specific point of view, selected or synthesized from moving-picture data including pictures taken from a plurality of viewpoints, the apparatus comprising:
    a memory for storing the moving picture data;
    an input unit; and
    a selector configured to select a picture to be displayed on the display unit, select and execute either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from the input unit, shift from the preset mode to the manual mode and output to the display unit a picture taken from a viewpoint based on the viewpoint setting command when the viewpoint setting command is entered, shift from the manual mode to the preset mode and output to the display unit the picture according to the preset picture display program when a viewpoint setting command is not entered within a predetermined period of time, continue in the manual mode and output to the display unit the picture from the viewpoint based on the viewpoint setting command when the viewpoint setting command is entered again for a second time within the predetermined period of time, and continue in the manual mode and output to the display unit a picture taken from a new viewpoint when a new viewpoint setting command is entered within the predetermined period of time.

2. The controller as set forth in claim 1, wherein the input unit outputs, as part of the viewpoint setting command, at least any one of a viewpoint position, sight line direction, and angle of a picture; and wherein the selector selects a picture whose viewpoint corresponds to the viewpoint setting command.

3. The controller as set forth in claim 1, wherein the input unit comprises a sensor, and the sensor outputs, as part of the viewpoint setting command, at least any one of a viewpoint position, sight line direction, and view angle of the picture, which is based on detection information from the sensor; and wherein the selector selects a picture taken from a viewpoint corresponding to the viewpoint setting command.

4. The apparatus controller as set forth in claim 1, wherein the input unit comprises a sensor, and the sensor includes a gyro functioning to detect a direction and outputs, as part of the viewpoint setting command, data which is based on direction information acquired by the gyro; and wherein the selector selects a picture taken from a viewpoint conforming to the viewpoint setting command.

5. The controller as set forth in claim 1, wherein the input unit comprises a sensor, and the sensor includes a sight line direction detector configured to make a picture analysis based on a picture of the users face and output, as part of the viewpoint setting command, data which is based on direction information acquired through the picture analysis; and wherein the selector selects a picture taken from a viewpoint conforming to the viewpoint setting command.

6. The controller as set forth in claim 1, wherein the selector synthesizes a picture taken from a viewpoint, not included in the moving-picture data, based on the moving-picture data including pictures taken from the plurality of viewpoints, and outputs the synthetic picture to the display unit.

7. The controller as set forth in claim 1, wherein the selector displays, on the display unit, displayable viewpoint position data corresponding to moving-picture data including pictures taken from a plurality of viewpoints and data for identification of the viewpoint position of a picture being displayed on the display unit.

8. The controller as set forth in claim 1, wherein the moving-picture information includes pictures taken from a plurality of viewpoints set correspondingly to a plurality of object positions spaced from each other; and wherein the selector selects a picture to be displayed based on the moving-picture information including the pictures taken from the plurality of viewpoints set correspondingly to the plurality of object positions spaced from each other.

9. A moving-picture transmission/reception system comprising:

a server holding moving-picture data including pictures taken from a plurality of viewpoints and for distributing the moving-picture data; and a user system to display a picture based on the moving-picture data received from the server, the user system comprising;

a selector configured to select a picture to be displayed on the display unit, select and execute either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from an input unit or a sensor, shift from the preset mode to the manual mode and output to the display unit a picture taken from a viewpoint based on the viewpoint setting command when the viewpoint setting command is entered, shift from the manual mode to the preset mode and output to the display unit the picture according to the preset picture display program when a viewpoint setting command is not entered within a predetermined period of time, continue in the manual mode and output to the display unit the picture from the viewpoint based on the viewpoint setting command when the viewpoint setting command is entered again for a second time within the predetermined period of time, and continue in the manual mode and output to the display unit a picture taken from a new viewpoint when a new viewpoint setting command is entered within the predetermined period of time.

10. The system as set forth in claim 9, wherein the server distributes picture data taken from the plurality of viewpoints and included in the moving-picture data;

wherein the user system includes a storage unit configured to store the picture data taken from the plurality of viewpoints, and included in the moving-picture data and the preset picture display program; and wherein the selector outputs, when in the preset mode, picture data taken from a specific viewpoint conforming to the preset picture display program while outputting, when in the manual mode, picture data taken from a specific viewpoint conforming to the viewpoint setting command.

11. The system as set forth in claim 9, wherein the server distributes picture data taken from the plurality of viewpoints and included in the moving-picture data, and wherein the user system receives, when in the preset mode, the picture data taken from the specific viewpoint conforming to the preset picture display program set at the server and outputs the received data to the display unit, while transmitting, when in the manual mode, picture designation information corresponding to the viewpoint setting command to the server while receiving picture data sent from the server according to the picture designation information, and outputs the picture data taken from the specific viewpoint conforming to the viewpoint setting command.

12. A picture display controlling method of outputting, to a display unit, a picture taken from a specific point of view, selected or synthesized from moving-picture data including pictures taken from a plurality of viewpoints, the method comprising:

setting either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from an input unit;

selecting a picture to be displayed on the display unit according to the selected mode;

shifting from the preset mode to the manual mode and displaying a picture taken from a viewpoint based on the viewpoint setting command when the viewpoint setting command is entered;

shifting from the manual mode to the preset mode and displaying the picture according to the preset picture display program when a viewpoint setting command is not entered within a predetermined period of time;

continuing in the manual mode and displaying the picture from the viewpoint based on the viewpoint setting command when the viewpoint setting command is entered again for a second time within the predetermined period of time; and continuing in the manual mode and displaying a picture taken from a new viewpoint when a new viewpoint setting command is entered within the predetermined period of time.

13. The method as set forth in claim 12, further comprising selecting a picture whose viewpoint corresponds to at least any one of the viewpoint position, sight line direction, and view angle of the picture, designated as the viewpoint setting command.

14. The method as set forth in claim 12, further comprising detecting a direction and output, as the viewpoint setting command, data which is based on direction information acquired by a gyro; and selecting a picture taken from a viewpoint conforming to the viewpoint setting command including data which is based on the direction information acquired by the gyro.

15. The method as set forth in claim 12, further comprising making a picture analysis based on a picture of the user's face to output, as the viewpoint setting command, data which is based on the direction information acquired through the picture analysis by a sight line direction detector; and selecting a picture taken from a viewpoint conforming to the viewpoint setting command including data which is based on the direction information acquired through the picture analysis.

16. The method as set forth in claim 12, further comprising synthesizing a picture taken from a viewpoint, not included in the moving-picture data, and outputting the synthetic picture to the display unit.

17. The method as set forth in claim 12, further comprising displaying, on the display unit, displayable viewpoint position data corresponding to moving-picture data and data for identification of the viewpoint position of a picture being displayed on the display unit.

18. The method as set forth in claim 13, further comprising taking pictures from a plurality of viewpoints set correspondingly to a plurality of object positions spaced from each other; and selecting a picture to be displayed based on the moving-picture information including the pictures taken from the plurality of viewpoints set correspondingly to the plurality of object positions spaced from each other.

19. A moving-picture transmitting/receiving method for use in a moving-picture information transmission/reception system including a server holding moving-picture data including pictures taken from a plurality of viewpoints and distributing the moving-picture data, and a user system to display a picture based on the moving-picture data received from the server, the method comprising:

selecting and executing either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from an input unit;

shifting from the preset mode to the manual mode and displaying a picture taken from a viewpoint based on the viewpoint setting command when the viewpoint setting command is entered;

shifting from the manual mode to the preset mode and displaying the picture according to the preset picture display program when a viewpoint setting command is not entered within a predetermined period of time;

continuing in the manual mode and displaying the picture from the viewpoint based on the viewpoint setting command when the viewpoint setting command is entered again for a second time within the predetermined period of time; and continuing in the manual mode and displaying a picture taken from a new viewpoint when a new viewpoint setting command is entered within the predetermined period of time.

20. The method as set forth in claim 19, further comprising distributing picture data taken from the plurality of viewpoints and included in the moving-picture data; and storing taken from the plurality of viewpoints and included in the moving-picture data and the preset picture display program, outputting, when in the preset mode, picture data taken from a specific viewpoint conforming to the preset picture display program while outputting, when in the manual mode, picture data taken from a specific viewpoint conforming to the viewpoint setting command.

21. The method as set forth in claim 19, further comprising distributing picture data taken from all viewpoints and included in the moving-picture data; and receiving, when in the preset mode, the picture data taken from the specific viewpoint conforming to the preset picture display program set at the server while outputting the received data to the display means, and transmitting, when in the manual mode, picture designation information corresponding to the viewpoint setting command to the server while receiving picture data sent from the server according to the picture designation information, and outputting the picture data taken from the specific viewpoint conforming to the viewpoint setting command.

22. A computer-readable storage media storing a program for causing a computer to perform a method for providing a picture display control for outputting, to a display means, a picture taken from a specific point of view, selected or synthesized from moving-picture data including pictures taken from a plurality of viewpoints, the method comprising:

setting either a preset mode in which a picture is displayed according to a preset picture display program corresponding to the moving-picture data and arranged as time-series data for identifying a picture to be displayed or a manual mode in which a picture to be displayed is identified based on a viewpoint setting command supplied from an input unit;

shifting from the preset mode to the manual mode and displaying a picture taken from a viewpoint based on the viewpoint setting command when the viewpoint setting command is entered;

shifting from the manual mode to the preset mode and displaying the picture according to the preset picture display program when a viewpoint setting command is not entered within a predetermined period of time;

continuing in the manual mode and displaying the picture from the viewpoint based on the viewpoint setting command when the viewpoint setting command is entered again for a second time within the predetermined period of time; and continuing in the manual mode and displaying a picture taken from a new viewpoint when a new viewpoint setting command is entered within the predetermined period of time.

* * * * *